(12) United States Patent
Kumar et al.

(10) Patent No.: US 12,525,043 B2
(45) Date of Patent: Jan. 13, 2026

(54) METHOD AND A SYSTEM FOR SUGGESTING AT LEAST ONE CAPTION FOR AN IMAGE

(71) Applicant: SAMSUNG ELECTRONICS CO., LTD., Suwon-si (KR)

(72) Inventors: Aditya Kumar, Noida (IN); Natasha Meena, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/227,720

(22) Filed: Jul. 28, 2023

(65) Prior Publication Data
US 2024/0062565 A1    Feb. 22, 2024

(30) Foreign Application Priority Data

Aug. 3, 2022    (IN) .............................. 202211044472

(51) Int. Cl.
*G06V 20/70* (2022.01)
*G06F 40/237* (2020.01)
(Continued)

(52) U.S. Cl.
CPC ............ *G06V 20/70* (2022.01); *G06F 40/237* (2020.01); *G06V 30/19173* (2022.01); *G06V 30/246* (2022.01)

(58) Field of Classification Search
None
See application file for complete search history.

(56) References Cited

U.S. PATENT DOCUMENTS

| 8,995,822 B2 | 3/2015 | Vasudevan et al. |
| 9,043,860 B2 | 5/2015 | Lee et al. |

(Continued)

FOREIGN PATENT DOCUMENTS

| AU | 2016256764 B2 | 8/2017 |
| CN | 107665356 A | 2/2018 |

(Continued)

OTHER PUBLICATIONS

Communication issued May 14, 2025 by the Intellectual Property Office of India in Indian Patent Application No. 202211044472.

*Primary Examiner* — Leon Viet Q Nguyen
(74) *Attorney, Agent, or Firm* — Sughrue Mion, PLLC

(57) ABSTRACT

Provided is a method for suggesting a caption for an image, comprising: receiving the image; determining a plurality of impacting categories associated with a plurality of contextual keywords for the image, each of the plurality of impacting categories representing a sentiment associated with the plurality of contextual keywords; grouping the plurality of contextual keywords into a plurality of groups based on the plurality of impacting categories; determining an order associated with the plurality of contextual keywords, based on a pre-determined impacting function; generating at least one caption by processing each contextual keyword, based on the order associated with the plurality of contextual keywords; determining a priority value associated with each of the at least one caption based on information associated with the corresponding caption, a user profile, and the image; and suggesting the caption from the at least one caption based on the priority value.

20 Claims, 38 Drawing Sheets

(51) Int. Cl.
*G06V 30/19* (2022.01)
*G06V 30/246* (2022.01)

(56) References Cited

U.S. PATENT DOCUMENTS

| | | |
|---|---|---|
| 10,558,750 B2 | 2/2020 | Lu et al. |
| 10,592,751 B2 | 3/2020 | Chen et al. |
| 2012/0323930 A1* | 12/2012 | Kennberg ........... G06F 16/5866 |
| | | 707/E17.02 |
| 2017/0061250 A1* | 3/2017 | Gao ....................... G06V 20/70 |
| 2018/0197098 A1 | 7/2018 | Subbian et al. |
| 2022/0019734 A1* | 1/2022 | Kurma ................. G06V 10/764 |
| 2022/0058391 A1 | 2/2022 | Kumar et al. |
| 2022/0245345 A1* | 8/2022 | Jain ......................... G06F 40/30 |

FOREIGN PATENT DOCUMENTS

| | | |
|---|---|---|
| KR | 10-2010-0095924 A | 9/2010 |
| KR | 10-2020-0104663 A | 9/2020 |
| KR | 10-2020-0106115 A | 9/2020 |

* cited by examiner

Example of Contextual Keyword Determination

FIG. 13
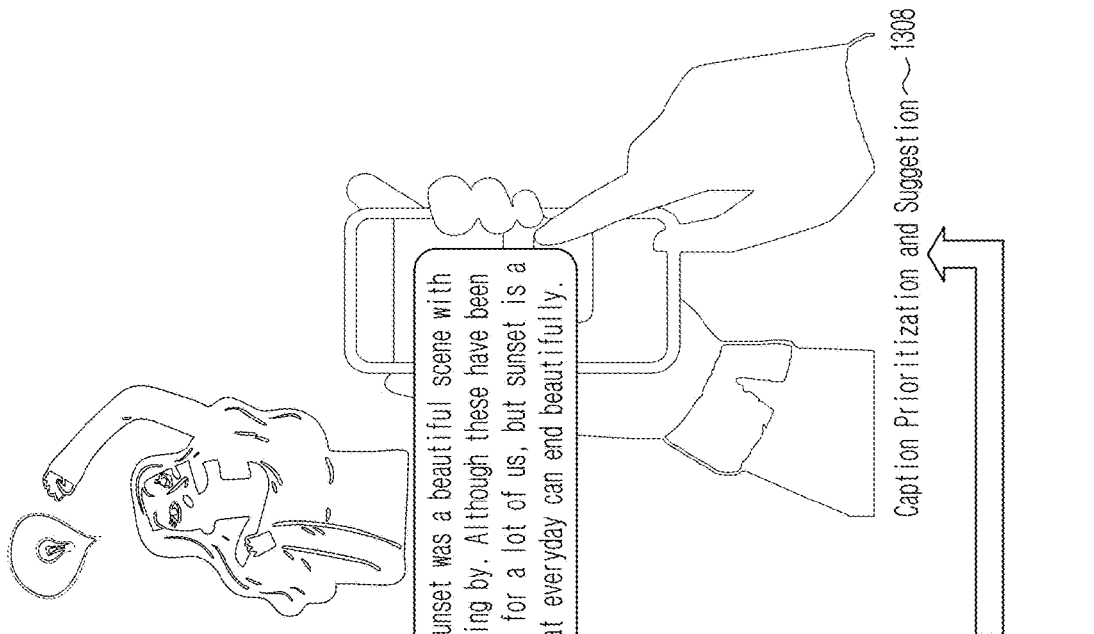
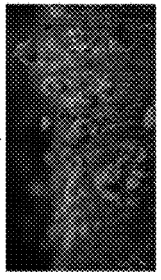

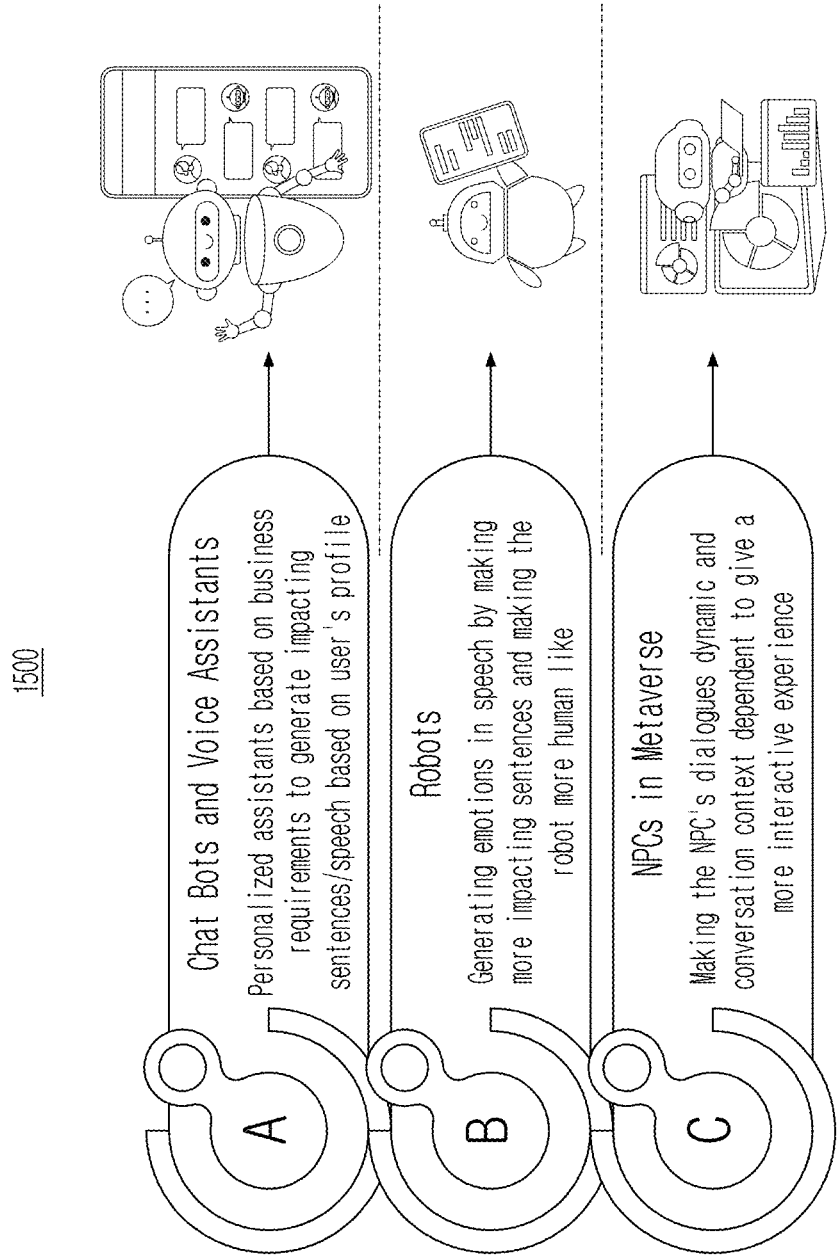

METHOD AND A SYSTEM FOR SUGGESTING AT LEAST ONE CAPTION FOR AN IMAGE

CROSS-REFERENCE TO RELATED APPLICATION

This application is based on and claims priority under 35 U.S.C. § 119(a) to Indian Patent Application No. 202211044472, filed on Aug. 3, 2022, in the Indian Patent Office, the disclosure of which is incorporated by reference herein in its entirety.

BACKGROUND

1. Field

The disclosure relates to generating at least one caption, and more specifically to suggesting the generated at least one caption for an image.

2. Description of Related Art

Automated suggestions are used in our every-day life while interacting with smart devices around us. However, there are limited automatic suggestions such as captions for different media. There is a need to expand the umbrella of trending yet limited automated suggestion systems. Further, there is a rawness of automated suggestions. Although the automated suggestions made closely match with the requirement of the user, but there are times when these suggestions are too raw to use. It is important to reduce the rawness of these suggestions and make them more sentimentally aligned with the requirement of the user. The automated suggestion of caption is targeted in the proposed solution to expand the suggestion's umbrella, which is beyond a raw description.

A number of available technologies in the related art are based on context and provide an output such as a smart suggestion based on a context associated with an input such as an incomplete word or a complete word. Examples of the technologies are mentioned below:
  a. User writes an incomplete word—keyboard shows possible suggestion (Context analysis based word completion)
  b. User writes a complete word—keyboard shows next target word (Context analysis based next word suggestion)
  c. User writes a word—Emoji/GIF suggestion closest matching to the word (Contextual or statistical analysis of word)
  d. User types a wrongly spelled word—smart auto-correction of the word (Context analysis based auto-correction)

Saving User's Time!
  a. On average a user types 38-40 words per minute ~200 characters per minute.
  b. Writing a perfect caption requires a significant amount of time. Suggesting a caption which is more than just a description of image, can significantly reduce the time taken by user before uploading their media(s).

Literary Skills is not a must for a good caption!
  a. Writing good captions require good literary skills making it hard to come up with captions.
  b. Linguistic knowledge becomes a barrier sometimes while writing a caption.
  c. A caption suggestion system which suggests a caption having a desired sentimental order can be a boon for the user.

There are many caption generators which are available in market for use, in form of applications or online sites. A few such solutions in the related art are as discussed below:

One caption generator has a fixed number of caption categories. User can choose amongst those categories, which all caption(s) suits the best for their purpose.

Another caption generator provides a suitable caption from amongst 15,000 captions written by professional writers. The search is done based on the caption inputted by the user, and the closest matching caption is outputted.

Another caption generator provides a caption template for online shops, businesses, bloggers, and personal Instagram accounts amongst 3000 available options. User can search from the available options and share to any accounts.

Another caption generator provides automatic search corresponding to the inputted image from amongst 15,000 captions and 50+ categories. It also provides some trending and famous hashtags.

Yet another caption generator provides an algorithm to generate captions from the image. This is more of the description of the image.

Apart from the above, the related art discloses a method for semantic natural language vector space for image captioning. Sentence generation by feeding image attributes to a RNN machine learning model designed to implement language modelling and sentence construction.

The related art also discloses a method for a kind of an image labelling. Defines the object function of image labeling model, Image is inputted to CNN models, obtains primitive image features, is weighted to primitive image features, inputs information into LSTM models, carries out backpropagation to error caused by prediction result The related art also discloses a method for spatial attention model for image captioning. It uses current hidden state information of a decoder long short-term memory (LSTM) to guide attention and to extract spatial image features for use in image captioning.

Limitations of the related art are as follows:
Database of fixed number of Captions:
  a. Most of the existing market solutions use a database of a fixed number of captions.
  b. However, in the proposed solution there is no requirement of database of captions. Only database of keywords is used, which is more widely and easily available in the form of dictionary.
Manual or Text based Search:
  a. In few of the existing solutions, the search of appropriate captions requires user's input either in form of "Manual Search" or in form of few initials of captions or texts in some form to describe brief of the input image.
  b. However, in the proposed solution, user need not interfere or give any other search input. The best suited caption is formed automatically and suggested to the user in the order of usage priority.
Descriptive Captions:
  a. The existing solutions which provide automated caption suggestion solution provide more of a descriptive caption. Descriptive caption is kind of textual description of what is present in the input media.
  b. However, in the proposed solution, a sentimental caption is suggested to the user. Sentimental caption is more than a descriptive caption as it has a structure which leaves a sentimental impact on the reader.

There is a need for a solution to overcome the above-mentioned drawbacks.

SUMMARY

According to an aspect of the disclosure, a method for suggesting a caption for an image, includes: receiving, by a receiving engine, the image as an input; determining, by an impacting category determination engine, a plurality of impacting categories associated with a plurality of contextual keywords for the image, where each of the plurality of impacting categories represent a sentiment associated with the plurality of contextual keywords; grouping; by an impacting category-based grouping engine, the plurality of contextual keywords into a plurality of groups based on the plurality of impacting categories; determining, by a re-ordering engine, an order associated with the plurality of contextual keywords, grouped in the plurality of groups, based on a pre-determined impacting function; generating, by a caption generation engine, at least one caption by processing each contextual keyword, grouped in the plurality of groups, based on the order associated with the plurality of contextual keywords grouped in the plurality of groups; determining, by a prioritization engine, a priority value associated with each of the at least one caption based on information associated with the corresponding caption, a user profile, and the image; and suggesting, by the prioritization engine, the caption from the at least one caption based on the priority value associated with each of the at least one caption.

The method may further include: determining, by a context determination engine, a plurality of fields associated with the image, where the plurality of fields comprises at least one of an object, a person, a filter, a camera setting, a sentiment, a time, and a place associated with the image; determining, by the context determination engine, a plurality of context words associated with the image based on the plurality of fields by classifying the plurality of fields; and determining, by a contextual keywords determination engine, the plurality of contextual keywords associated with the image based on the plurality of context words The method may further include: mapping a plurality of context words associated with the image with a plurality of words stored in a lexical database; and determining the plurality of contextual keywords based on the mapping of the plurality of context words with the plurality of words in the lexical database, at least one synonym, at least one adverb, at least one adjective, at least one proverb, at least one quote, and at least one trending keyword related to the plurality of context words.

The determining the plurality of impacting categories associated with the plurality of contextual keywords may include: classifying at least one contextual keyword from the plurality of contextual keywords, as one of an adjective, a noun, a pronoun, an adverb, or a phrase, based on pre-stored information associated with the plurality of contextual keywords; and mapping the at least one contextual keyword with a plurality of words stored in a database to determine an impact score associated with the at least one contextual keyword, where each of the plurality of words corresponds to an impact score in the database; and determining the plurality of impact categories associated with the plurality of contextual words based on the impact score associated with the at least one contextual keyword.

The order associated with the plurality of contextual keywords may be an order of an impact intended to be created on a user with respect to the image.

The plurality of impacting categories may include a positive impact category, a negative category, an inspirational impact category, a motivational impact category, a de-motivational impact category, and a neutral impact category.

The method may further include: forming, by the re-ordering engine, a caption structure associated with the image, based on the plurality of groups where, the order associated with the plurality of contextual keywords, grouped in the plurality of groups, is determined based on the caption structure.

The generating the at least one caption may include: generating a plurality of texts for the plurality of groups that are ordered in a caption structure, where each text from the plurality of texts is generated for each contextual keyword grouped in the plurality of groups; and fusing the plurality of texts together-based on a connector associated with the plurality of texts to generate the at least one caption.

The information associated with the corresponding caption, the user profile, and the image may include a linguistic value, a user profile value, and a sentiment difference value associated with the at least one caption.

The determining, by the prioritization engine, the priority value associated with each of the at least one caption may include: determining, by the prioritization engine, a linguistic value, a user profile value, and a sentiment difference value associated with the at least one caption.

The determining, by the prioritization engine, the linguistic value associated with the at least one caption may include: determining a complexity associated with each of the at least one caption using a Natural Language Processing (NLP) tool to extract at least one linguistic feature from each caption; and generating the linguistic value associated with each caption by assigning a score to each caption based on the complexity of each keyword associated with each caption.

The determining the complexity associated with each of the at least one caption may include: performing a categorization of the at least one caption based on at least one lexical feature, at least one morphological feature, at least one raw text feature, at least one morpho-syntactic feature, at least one syntactic feature, and at least one discursive feature associated with the at least one caption.

The determining, by the prioritization engine, the user profile value associated with each of the at least one caption may include: determining an age-based scoring associated with the at least one caption for a user based on the at least one linguistic value; and determining a hobby-based scoring associated with the at least one caption for the user based on at least one keyword in the at least one caption, where each keyword is scored against at least one hobby of the user using a similarity score.

The determining, by the prioritization engine, the sentiment difference value associated with each of the at least one caption may include: generating a caption sentiment associated with the at least one caption by performing a weighted summation of a sentiment score associated with at least one keyword in the at least one caption; calculating an image sentiment associated with the at least one caption by performing a weighted summation of the sentiment associated with each of the plurality of contextual keywords associated with the image; and determining the at least one sentiment difference value associated with the at least one caption based on the caption sentiment and the image sentiment.

The sentiment score associated with the at least one keyword may be calculated based on mapping the at least one keyword with a plurality of words stored in a database, in which each of the plurality of words corresponds to a sentiment score in the database.

The determining, by the prioritization engine, the priority value associated with each of the at least one caption may include: assigning a weight to each of the linguistic value, the user profile value, and the sentiment difference value associated with the at least one caption for a user, where each weight is determined based on a gradient descent model; performing a weighted summation of the linguistic value, the user profile value, and the sentiment difference value associated with the at least one caption based on the weight to generate the priority value.

The method may further include: tuning, by the prioritization engine, the priority value based on user feedback associated with at least one previously generated caption for the user.

The method may further include: modifying, by a modification engine, the at least one caption based on a user input with respect to the at least one caption.

The user input may be a selection of at least one customized setting associated with the at least one caption for generating at least one new caption, where the at least one customized setting is presented to the user on a User Interface (UI).

According to an aspect of the disclosure, a system for suggesting a caption for an image, includes: a receiving engine configured to receive the image as an input; an impacting category determination engine configured to determine a plurality of impacting categories associated with a plurality of contextual keywords for the image, where each of the plurality of impacting categories represent a sentiment associated with the plurality of contextual keywords; an impacting category-based grouping engine configured to group the plurality of contextual keywords into a plurality of groups based on the plurality of impacting categories; a re-ordering engine configured to determine an order associated with the plurality of contextual keywords, grouped in the plurality of groups, based on a pre-determined impacting function; a caption generation engine configured to generate at least one caption from the plurality of groups by processing each contextual keyword, grouped in the plurality of groups, based on the order associated with the plurality of contextual keywords grouped in the plurality of groups; and a prioritization engine configured to determine a priority value associated with each of the at least one caption based on information associated with the corresponding caption, a user profile, and the image, where the prioritization engine is further configured to suggest the caption from the at least one caption based on the priority value associated with each of the at least one caption.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 illustrates a use case diagram depicting a caption suggestion for an image, in accordance with an embodiment;

FIG. 15 illustrates a use case diagram depicting impacting conversations with virtual assistants, in accordance with an embodiment;

DETAILED DESCRIPTION

Figure 1:
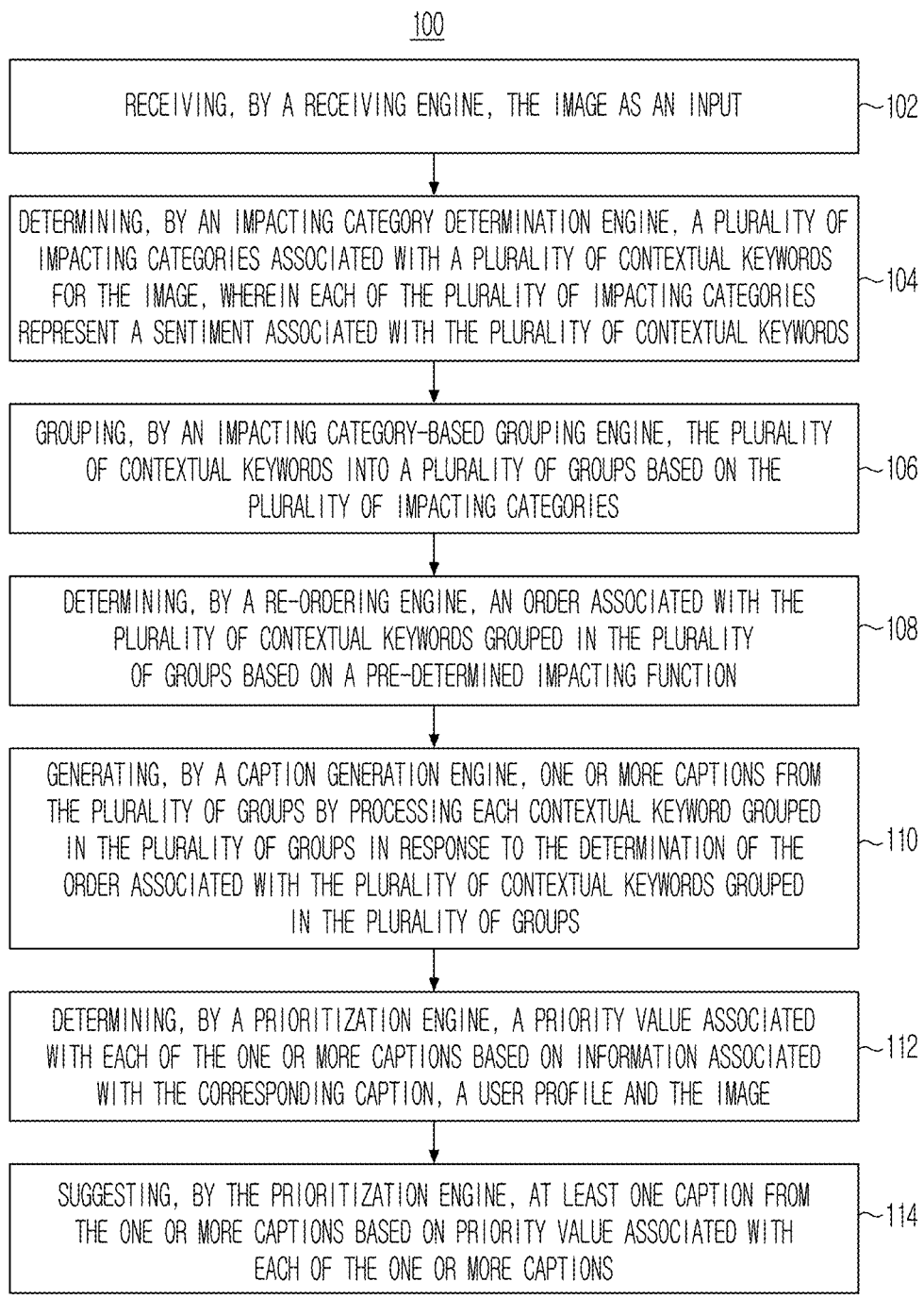
FIG. 1 illustrates a flow diagram depicting a method for suggesting at least one caption for an image, in accordance with an embodiment.

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or system that comprises a list of steps does not include only those steps but may include other steps not expressly listed or inherent to such process or system. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, systems, and examples provided herein are illustrative only and not intended to be limiting.

Further, skilled artisans will appreciate that elements in the drawings are illustrated for simplicity and may not have been necessarily drawn to scale. For example, the flow charts illustrate the system in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

Functions related to Artificial Intelligence (AI) according to the disclosure are operated through the processor and the memory. The processor may be composed of one or more processors. In this case, the one more processors may be a general purpose processor such as a CPU, an AP, a digital signal processor (DSP), or the like, or, a graphics dedicated processor such as GPU, a vision processing unit (VPU), or an AI dedicated processor such as an NPU. One or more processors may control to process an input data according to a predefined operating rule or AI model stored in the memory. Alternatively, when one or more processors are an AI dedicated processor, the AI dedicated processor may be designed with a hardware structure specialized for processing a specific AI model.

The predefined operating rule or AI model is characterized by being made through learning. Being made through learning means that a basic AI model is trained using a plurality of learning data by a learning algorithm, thereby creating a predefined operation rule or AI model set to perform a desired feature (or purpose). Such learning may be made in a device itself in which AI according to the disclosure is performed, or may be made through a separate server and/or system. Examples of learning algorithms include supervised learning, unsupervised learning, semi-supervised learning, or reinforcement learning, but are not limited to the above examples.

The AI model may be composed of a plurality of neural network layers. Each of the plurality of neural networks has a plurality of weight values, and performs neural network calculation through calculations between a calculation result of a previous layer and a plurality of weights. The plurality of weight values that the plurality of neural network layers have may be optimized by learning results of an AI model. For example, the plurality of weights may be updated to reduce or minimize a loss value or a cost value obtained from the AI model during the learning process. The AI neural networks may include a deep neural network (DNN), for example, a convolutional neural network (CNN), a recurrent neural network (RNN), a restricted boltzmann machine (RBM), deep belief network (DBN), bidirectional recurrent deep neural network (BRDNN), deep Q-networks, and the like, but are not limited to the above examples.

FIG. 1 illustrates a flow diagram depicting a method 100 for suggesting at least one caption for an image, in accordance with an embodiment. The method 100 aims at providing the at least one caption to a user with a pre-defined impact that a writer wishes to create on the user. The method 100 may employ an impacting function-based ordering for generating the at least one caption. The at least one caption may be suggested upon being determined as a caption with a highest priority.

At operation 102, the method 100 includes receiving, by a receiving engine, the image as an input.

At operation 104, the method 100 includes determining, by an impacting category determination engine, a plurality of impacting categories associated with a plurality of contextual keywords for the image, wherein each of the plurality of impacting categories represent a sentiment associated with the plurality of contextual keywords.

At operation 106, the method 100 includes grouping, by an impacting category-based grouping engine, the plurality of contextual keywords into a plurality of groups based on the plurality of impacting categories.

At operation 108, the method 100 includes determining, by a re-ordering engine, an order associated with the plurality of contextual keywords grouped in the plurality of groups based on a pre-determined impacting function.

At operation 110, the method 100 includes generating, by a caption generation engine, one or more captions from the plurality of groups by processing each contextual keyword grouped in the plurality of groups in response to the determination of the order associated with the plurality of contextual keywords grouped in the plurality of groups.

At operation 112, the method 100 includes determining, by a prioritization engine, a priority value associated with each of the one or more captions based on information associated with the corresponding caption, a user profile and the image.

At operation 114, the method 100 includes suggesting, by the prioritization engine, at least one caption from the one or more captions based on priority value associated with each of the one or more captions.

Figure 2:
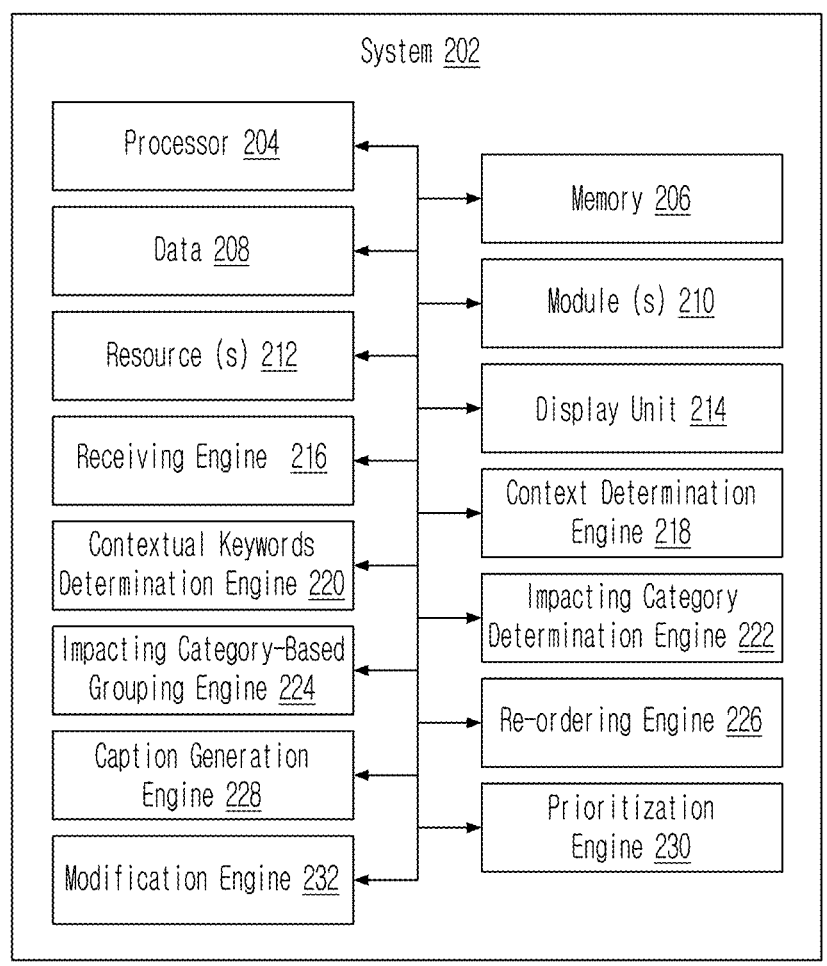
FIG. 2 illustrates a schematic block diagram of a system for suggesting at least one caption for an image, in accordance with an embodiment.

FIG. 2 illustrates a schematic block diagram 200 of a system 202 for suggesting at least one caption for an image, in accordance with an embodiment.

The system 202 may include a processor 204, a memory 206, data 208, module(s) 210, resource(s) 212, a display unit 214, a receiving engine 216, a context determination engine 218, a contextual keywords determination engine 220, an impacting category determination engine 222, an impacting category-based grouping engine 224, a re-ordering engine 226, a caption generation engine 228, a prioritization engine 230, and a modification engine 232.

In an embodiment, the processor 204, the memory 206, the data 208, the module(s) 210, the resource(s) 212, the display unit 214, the receiving engine 216, the context determination engine 218, the contextual keywords determination engine 220, the impacting category determination engine 222, the impacting category-based grouping engine 224, the re-ordering engine 226, the caption generation engine 228, the prioritization engine 230, and the modification engine 232 may be communicatively coupled to one another.

As would be appreciated, the system 202, may be understood as one or more of a hardware, a software, a logic-based program, a configurable hardware, and the like. In an example, the processor 204 may be a single processing unit or a number of units, all of which could include multiple computing units. The processor 204 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 204 may be configured to fetch and/or execute computer-readable instructions and/or data stored in the memory 206.

In an example, the memory 206 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 206 may include the data 208. The data 208 serves, amongst other things, as a repository for storing data processed, received, and generated by one or more of the processor 204, the memory 206, the module(s) 210, the resource(s) 212, the display unit 214, the receiving engine 216, the context determination engine 218, the contextual keywords determination engine 220, the impacting category determination engine 222, the impacting category-based grouping engine 224, the re-ordering engine 226, the caption generation engine 228, the prioritization engine 230, and the modification engine 232.

The module(s) 210, amongst other things, may include routines, programs, objects, components, data structures, etc., which perform particular tasks or implement data types. The module(s) 210 may also be implemented as, signal processor(s), state machine(s), logic circuitries, and/or any other device or component that manipulate signals based on operational instructions.

Further, the module(s) 210 may be implemented in hardware, as instructions executed by at least one processing unit, e.g., processor 204, or by a combination thereof. The processing unit may be a general-purpose processor that executes instructions to cause the general-purpose processor to perform operations or, the processing unit may be dedicated to performing the required functions. In another aspect of the present disclosure, the module(s) 210 may be machine-readable instructions (software) which, when executed by a processor/processing unit, may perform any of the described functionalities.

In some example embodiments, the module(s) 210 may be machine-readable instructions (software) which, when executed by a processor 204/processing unit, perform any of the described functionalities.

The resource(s) 212 may be physical and/or virtual components of the system 202 that provide inherent capabilities and/or contribute towards the performance of the system 202. Examples of the resource(s) 212 may include, but are not limited to, a memory (e.g., the memory 206), a power unit (e.g., a battery), a display unit (e.g., the display unit 214) etc. The resource(s) 212 may include a power unit/battery unit, a network unit, etc., in addition to the processor 204, and the memory 206.

The display unit 214 may display various types of information (e.g., media contents, multimedia data, text data, etc.) to the system 202. The display unit 214 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an example, the receiving engine 216, the context determination engine 218, the contextual keywords determination engine 220, the impacting category determination engine 222, the impacting category-based grouping engine 224, the re-ordering engine 226, the caption generation engine 228, the prioritization engine 230, and the modification engine 232, amongst other things, include routines, programs, objects, components, data structures, etc., which perform particular tasks or implement data types. The receiving engine 216, the context determination engine 218, the contextual keywords determination engine 220, the impacting category determination engine 222, the impacting category-based grouping engine 224, the re-ordering engine 226, the caption generation engine 228, the prioritization engine 230, and the modification engine 232 may also be implemented as, signal processor(s), state machine(s), logic circuitries, and/or any other device or component that manipulate signals based on operational instructions. Further, the receiving engine 216, the context determination engine 218, the contextual keywords determination engine 220, the impacting category determination engine 222, the impacting category-based grouping engine 224, the re-ordering engine 226, the caption generation engine 228, the prioritization engine 230, and the modification engine 232 can be implemented in hardware, instructions executed by a processing unit, or by a combination thereof. The processing unit can comprise a computer, a processor, such as the processor 204, a state machine, a logic array or any other suitable devices capable of processing instructions. The processing unit can be a general-purpose processor which executes instructions to cause the general-purpose processor to perform the required tasks or, the processing unit can be dedicated to performing the required functions.

Continuing with the above embodiment, the receiving engine 216 may be configured to receive an input. The input may be the image for which the at least one caption is to be generated.

Furthermore, the context determination engine 218 may be configured to processing the image. Based on the processing of the image, the context determination engine 218 may be configured to determine a number of fields associated with the image. The number of fields may include one or more of at least one object, and at least one person in the image, one or more filters applied to the image, a camera setting used for clicking the image, a sentiment, a time, and a place associated with the image. Moving forward, upon determining the number of fields, the context determination engine 218 may be configured to determine a number of context words associated with the image based on the number of fields. The number of context words may be determined based on classifying the number of fields.

Subsequent to determining the number of context words by the context determination engine 218, the contextual keywords determination engine 220 may be configured to determine a number of contextual keywords associated with the image based on the number of context words. For determining the number of contextual keywords, the contextual keywords determination engine 220 may be configured to map the number of context words associated with the image with a number of words stored in a lexical database. Furthermore, based on the mapping, the contextual keywords determination engine 220 may be configured to determine one or more synonyms, one or more adverbs, one or more adjectives, one or more proverbs, one or more quotes, and one or more trending keywords related to the number of context words as the number of contextual keywords.

Continuing with the above embodiment, the impacting category determination engine 222 may be configured to determine a number of impact categories associated with the number of contextual keywords for the image. Each of the number of impact categories may represent a sentiment associated with the number of contextual keywords. Examples of the number of impact categories may include, but are not limited to, a positive impact category, a negative impact category, an inspirational impact category, a motivational impact category, a de-motivational impact category, and a neutral impact category.

For determining the number of impact categories, the impacting category determination engine 222 may be configured to classify one or more contextual keywords amongst the number of contextual keywords. The one or more contextual keywords may be classified as one of an adjective, a noun, a pronoun, an adverb, one or more phrases based on pre-stored information associated with the plurality of contextual keywords. Further, the impacting category determination engine 222 may be configured to map the one or more contextual keywords with a number of words stored in a database to determine an impact score associated with the one or more contextual keywords. Each of the number of words may correspond to an impact score in the database. Moving forward, the impacting category determination engine 222 may be configured to determine the number of impact categories associated with the number of contextual words based on the impact score associated with the number of contextual keywords.

Continuing with the above embodiment, upon determination of the number of impact categories, the impacting category-based grouping engine 224 may be configured to group the number of contextual keywords into a number of groups based on the plurality of impacting categories.

Moving forward, the re-ordering engine 226 may be configured to determine an order associated with the number of contextual keywords grouped in the number of groups. The order may be determined based on a pre-determined impacting function. Furthermore, the pre-determined impacting function may be an order of an impact intended to be created on the user with respect to the image. Subsequently, the re-ordering engine 226 may be configured to form a caption structure associated with the image. The caption structure may be generated based on the number of groups generated based on the number of impact categories. The order associated with the number of contextual keywords grouped in the number of groups may be determined in the caption structure.

Continuing with the above embodiment, the caption generation engine 228 may be configured to generate one or more captions from the number of groups in response to the determination of the order associated with the number of contextual keywords grouped in the number of groups. The one or more captions may be generated by processing each contextual keyword grouped in the number of groups. Processing each contextual keyword by the caption generation engine 228 may include generating a number of texts for the number of groups ordered in a caption structure. Each text from the number of texts may be generated for each contextual keyword grouped in the number of groups. Further, the caption generation engine 228 may be configured to fuse the number of texts together based on a connector associated with the number of texts to generate the one or more captions.

Subsequent to generation of the one or more captions, the prioritization engine 230 may be configured to determine a priority value associated with each of the one or more captions. The priority value may be based on information associated with the corresponding caption, a user profile and the image. Furthermore, the information associated with the corresponding caption, the user profile and the image may include a linguistic value, a user profile value; and a sentiment difference value associated with the one or more captions. The prioritization engine 230 may be configured to determine the linguistic value, the user profile value, and the sentiment difference value associated with the one or more captions for determining the priority value associated with each of the one or more captions. For determining the linguist value, the prioritization engine 230 may be configured to determine a complexity associated with each of the one or more captions using a Natural Language Processing (NLP) tool to extract one or more linguistic features from each caption. Further, the prioritization engine 230 may be configured to generate the linguistic value associated with each caption by assigning a score to each caption. The score may be assigned based on the complexity of each keyword associated with each caption. Moving forward, the prioritization engine 230 may be configured to determine the complexity by performing a categorization of each keyword associated with the one or more captions. The categorization may be based on one or more lexical features, one or more morphological features, one or more raw text features, one or more morpho-syntactic features, one or more syntactic features and one or more discursive features associated with each keyword associated with the one or more captions.

Continuing with the above embodiment, the prioritization engine 230 may be configured to determine the user profile value by determining an age-based scoring associated with the one or more captions for a user based on the one or more linguistic values. Further, the prioritization engine 230 may be configured to determine a hobby-based scoring associated with the one or more captions for the user based on one or more keywords in the one or more captions. Each keyword from the one or more keywords may be scored against one or more hobbies of the user using a similarity score.

In continuation with the above embodiment, the prioritization engine 230 may be configured to determining the sentiment difference value by generating a caption sentiment associated with the one or more captions. The caption sentiment may be generated by performing a weighted summation of a sentiment score associated with one or more keywords in the one or more captions. The prioritization engine 230 may further be configured to calculate an image sentiment associated with the one or more captions by performing a weighted summation of the sentiment associated with each of the number of contextual keywords associated with the image. Furthermore, the prioritization engine 230 may further be configured to determine the one or more sentiment difference values associated with the one or more captions based on the caption sentiment and the image sentiment. Further, the sentiment score associated with the one or more keywords may be calculated based on mapping the one or more keywords with the number of words stored in a database. Each of the number of words may correspond to a sentiment score in the database.

Continuing with the above embodiment, determining the priority value by the prioritization engine 230 may include assigning a weight to each of the linguistic value, the user profile value, and the sentiment difference value associated with the one or more captions for a user. Each weight may be determined based on a gradient descent model. Further, the prioritization engine 230 may be configured to perform a weighted summation of the linguistic value, the user profile value, and the sentiment difference value associated with the one or more captions upon assigning the weight to generate the priority value. Furthermore, the prioritization engine 230 may be configured to tune the priority value based on user feedback associated with at least one previously generated caption for the user. To that understanding, the prioritization engine 230 may be configured to suggest the at least one caption from the one or more captions based on the priority value associated with each of the one or more captions.

Moving forward, the modification engine 232 may be configured to modify the at least one caption based on a user input with respect to the at least one caption. The user input may be a selection of one or more customized settings associated with the one or more captions for generating at least one new caption. The one or more customized settings may be presented to the user on a User Interface (UI).

Figure 3:
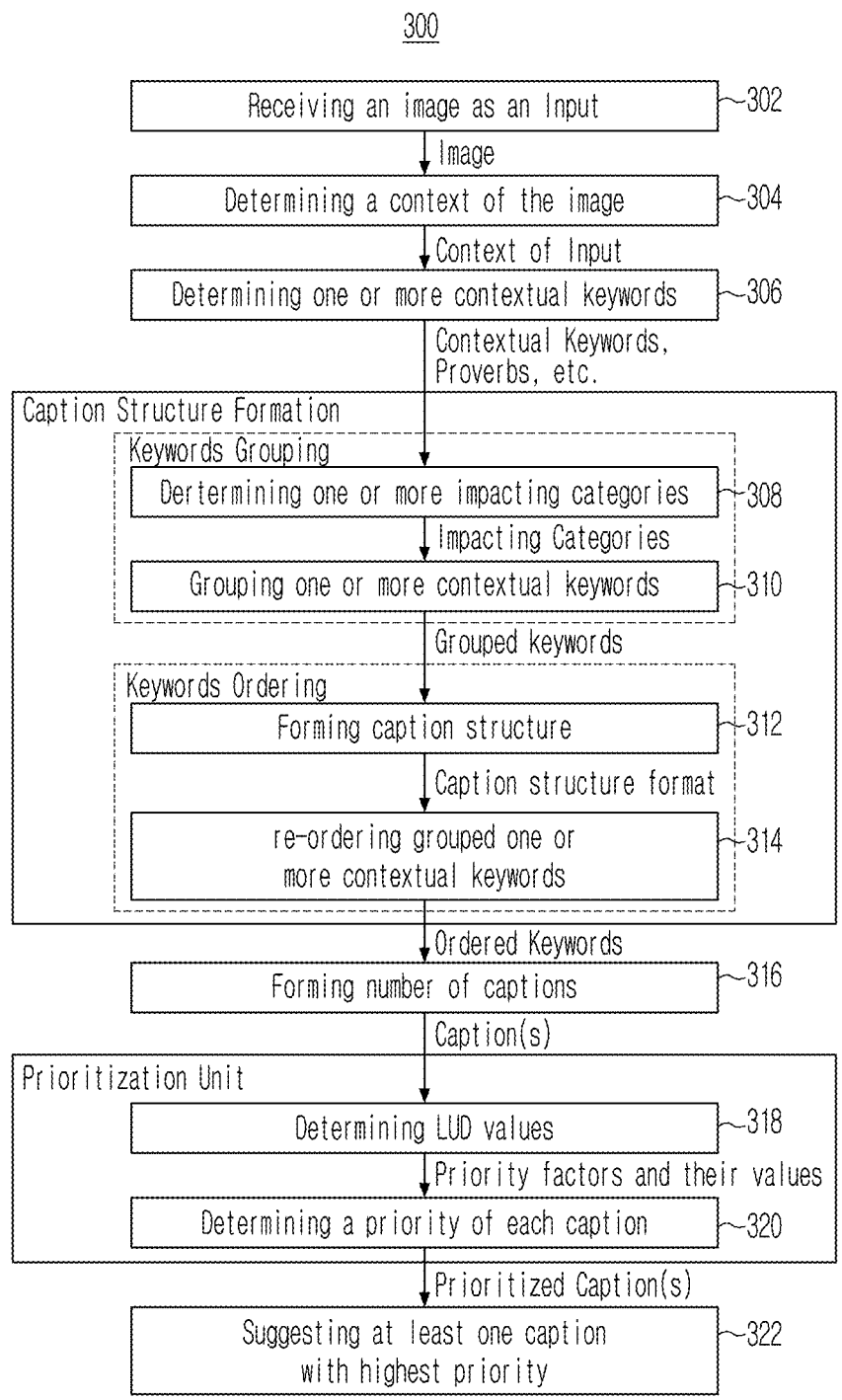
FIG. 3 illustrates an operational flow diagram depicting a process for suggesting at least one caption for an image, in accordance with an embodiment.

FIG. 3 illustrates an operational flow diagram depicting a process 300 for suggesting at least one caption for an image, in accordance with an embodiment. The process 300 may be performed by the system 202 as referred in the FIG. 2. The at least one caption may be generated based on determining a context associated with the image. Based on the context, one or more contextual keywords may be determined. Further, the one or more contextual keywords may be processed for generation of a number of captions. Moreover, the at least one caption may be selected from the number of captions generated for the image. The at least one caption may correspond to a highest priority value amongst the number of captions generated associated with the image.

At operation 302, the process 300 may include receiving the image as an input. The image may be received as the input by the receiving engine 216 as referred in the FIG. 2.

At operation 304, the process 300 may include determining the context related to the image. The context may represent information related to an object, one or more filters, a time and a place of the image. The context may be determined by the context determination engine 218 as referred in the FIG. 2.

At operation 306, the process 300 may include determining the one or more contextual keywords related to one or more context words. The one or more context words may be words in the context and the one or more context words may be limited in number. The one or more contextual keywords may be a synonym, an adverb, an adjective, a proverb and a quote related to the context of the image along with a trending keyword or a famous saying. The one or more contextual keywords may be determined by the contextual keywords determination engine 220 as referred in the FIG. 2.

At operation 308, the process 300 may include determining one or more impacting categories of the one or more contextual keywords. The one or more impacting categories may refer to a sentiment associated with each of the one or more contextual keywords. The one or more impacting categories may be determined by the impacting category determination engine 222 as referred in the FIG. 2.

At operation 310, the process 300 may include grouping the one or more contextual keywords based on the one or more impacting categories associated with the one or more contextual keywords. The grouping may be performed by the impacting category-based grouping engine 224 as referred in the FIG. 2.

At operation 312, the process 300 may include forming a caption structure based on the one or more impacting categories. The capture structure may be formed by the re-ordering engine 226 as referred in the FIG. 2.

At operation 314, the process 300 may include ordering the one or more contextual keywords upon grouping in a caption structure based on a pre-determined impacting function. The pre-determined impacting function may refer to an order of impact that a writer wishes to create on a reader of the at least one caption. The ordering may be performed by the re-ordering engine 226.

At operation 316, the process 300 may include processing the one or more contextual keywords upon grouping and ordering of the one or more contextual keywords to initially form texts corresponding to each group of the one or more contextual keywords and, second, to fuse the generated texts to form the number of captions including a desired order of impact. The processing of the one or more contextual keywords and forming of the number of captions may be performed by the caption generation engine 228 as referred in the FIG. 2.

At operation 318, the process 300 may include determining a linguistic value, a user profile score, a sentiment difference score using information associated with the number of captions, a profile of a user and the image respectively. The linguistic value, the user profile score, and the sentiment difference score may be determined by the prioritization engine 230 as referred in the FIG. 2.

At operation 320, the process 300 may include applying a weighted average function of the linguistic value, the user profile score, and the sentiment difference score to determine a priority associated with each of the number of captions. The weighted average may be applied to determine the priority by the prioritization engine 230.

At operation 322, the process 300 may include suggesting a caption amongst the number of captions to the user based on a highest priority value associated with the caption amongst the number of captions. The caption may be the at least one caption suggested by the caption generation engine 232 as referred in the FIG. 2. A usage history related to the user may be recorded for fine tuning weights associated with the number of captions. The at least one caption may further be modified to change gender pronouns, active/passive voice or any other details as per a user request.

Figure 4:
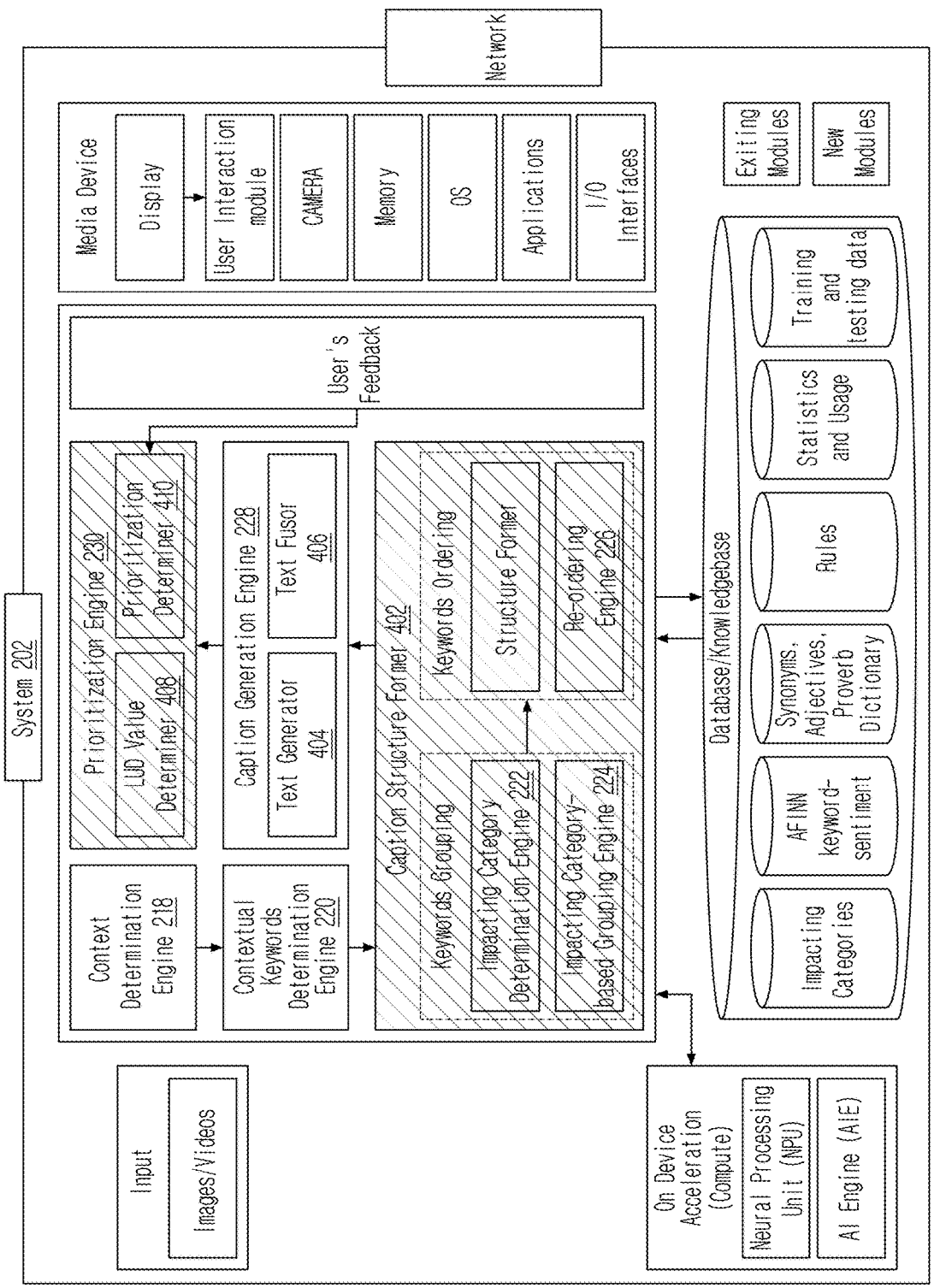
FIG. 4 illustrates an architectural diagram depicting a method for suggesting at least one caption for an image, in accordance with an embodiment.

FIG. 4 illustrates an architectural diagram 400 depicting a method for suggesting at least one caption for an image, in accordance with an embodiment. The architectural diagram may include the context determination engine 218, the contextual keywords determination engine 220, a caption structure former 402, the caption generation engine 228, and the prioritization engine 230. The caption structure former 402 may include the impacting category determination engine 222, the impacting category-based grouping engine 224, and the re-ordering engine 226. The caption generation engine 228 may include a text generator 404, and a text fuser 406. The prioritization engine 230 may include a LUD value determiner 408, and a prioritization determiner 410.

The image received as an input may be processed by the context determination engine 218 and a context associated with the image may be determined based on the processing. The context may represent information associated with an object, a filter, an emotion, people, an animal, a generic categorization, a color variant, a time, and a place of the image.

Using the context of Image, more related keywords may be determined by the contextual keyword determination engine 220. The more related keywords may interchangeably be referred as one or more contextual keywords. The one or more contextual keywords may be synonyms, adverbs, adjectives, proverbs and quotes related to the context of the image along with trending keywords or famous sayings.

Further, the one or more contextual keywords may be processed to determine a sentiment or an impact associated with the each of the one or more contextual keywords. The processing may be performed by the impacting category determination engine 222 incorporated within the caption structure former 402. Based on the impact, one or more impacting categories may be determined. The one or more impacting categories may be defined as categories based on an "impact created on a reader". In an example embodiment, the impact may be a positive impact, a negative impact, and an inspiration/emotional impacts or the like.

Continuing with the above embodiment, based on the one or more impacting categories, the one or more contextual keywords may be grouped by the impacting category-based grouping engine 224 and a caption structure may also be formed by the re-ordering engine 226 based on the one or more impacting categories. The grouped one or more contextual keywords may further be re-ordered inside the caption structure by the re-ordering engine 226 according to a pre-defined impacting function. The impacting function may be based on the impact the writer wishes to create on the reader. In an example embodiment, most of the good captions start with a positive note, then negative and end with an inspirational impact on the reader.

The re-ordered group of the one or more contextual keywords, or the caption structure may then be used to perform, first, a text generation on the one or more contextual keywords grouped in a particular impacting category. The text may be generated by the text generator 404. Further, a text fusion on the text generated in order to preserve an impact order of the caption structure is performed by the text fusor 406. Thus, a number of captions may be formed by the caption generation engine 228.

A Linguistic Value (L), a User profile score (U) and a Sentiment difference score (D) associated with the number of caption(s), a user profile and the image may be determined by the LUD value determiner 408 incorporated within the prioritization engine 230. A weighted contribution of the L, U and D may be used to find a priority value corresponding to each caption and thus, a suggestion is made to the user according to the priority value. The priority value may be determined by the prioritization determiner 410.

Figure 5A:
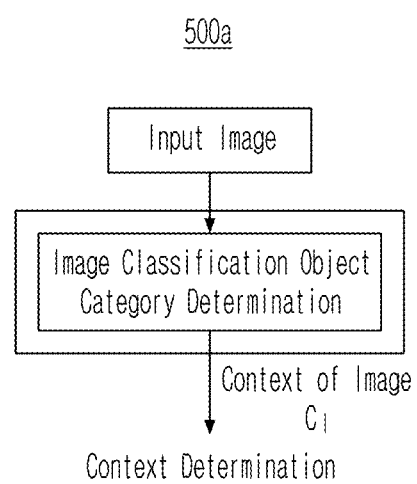
FIG. 5A illustrates an operational flow diagram depicting a process for determining a context associated with an image, in accordance with an embodiment.

FIG. 5A illustrates an operational flow diagram depicting a process 500*a* for determining a context associated with an image, in accordance with an embodiment. The process 500*a* may be performed by the context determination engine 218 as referred in the FIG. 2. The process 500*a* may include receiving an image as an input and determining the context $C_I$ as an output. The process 500*a* may include an image classification field-value determination.

Given a fixed set of fields, the process 500*a* may include determining corresponding context words. The fixed set of fields may be a fixed set of keys required to perform a classification of the image. One or more instances of the fixed set of fields include, one or more objects present in the image, a daytime, a filter, and a background or the like.

The context words corresponding to the one or more image object present in the image may be determined by a Machine Learning (ML) model trained to perform an image and object category classification. A RCNN model may be used for implementation of a context determination. One or more values corresponding to other fields (Daytime, Background, Filters, etc.) may be determined by utilizing metadata of the image including the date and time of a capturing of the image, a geotag of the image, the filter applied by a user, one or more camera settings or the like.

The generated context words corresponding to the context of the image may be stored in a vector format for further use.

Thus, the context of Image, $C_I$ is mathematically represented in the equation 1 as mentioned below:

$$\begin{cases} C_I[i] = \text{Context Words, where } 1 \le i \le n; \\ \text{where } n \text{ is the number of Context words} \end{cases} \quad \text{Equation 1}$$

Figure 5B:
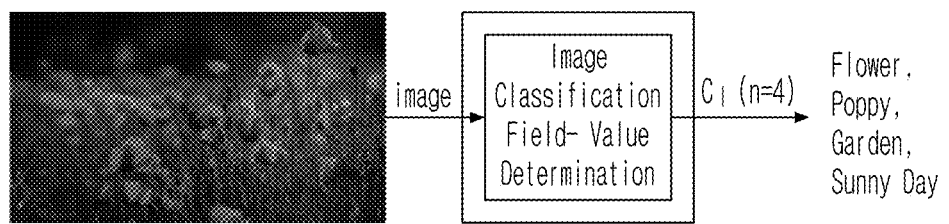
FIG. 5B illustrates an example diagram for determining the context of the image, in accordance with an embodiment.

FIG. 5B illustrates an example diagram 500b for determining the context of the image, in accordance with an embodiment. In an example embodiment, an output may be the context of the image i.e., 'n' context words. The context of the image may include a flower, a poppy (corresponding to an image objects field), a garden (corresponding to a background/a geotag), a sunny day (corresponding to a light/a filter).

Figure 6A:
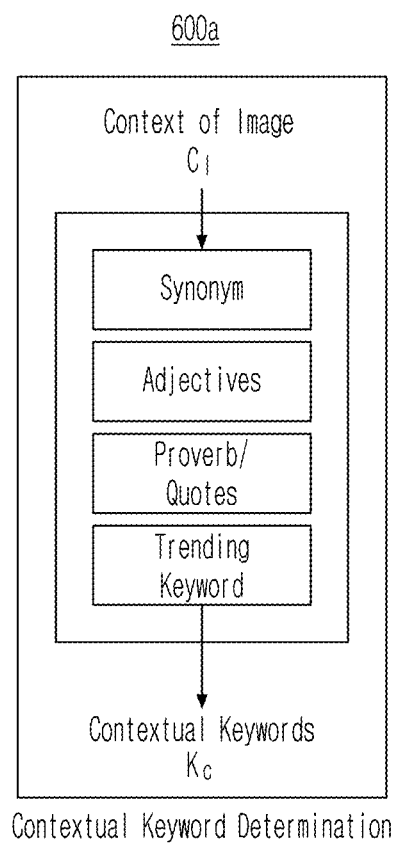
FIG. 6A illustrates an operational flow diagram a process for determining one or more contextual keywords associated with an image, in accordance with an embodiment.

FIG. 6A illustrates an operational flow diagram a process 600a for determining one or more contextual keywords associated with an image, in accordance with an embodiment. The one or more contextual keywords may be determined based on a number of context words. The process 600a may include receiving a context in the form of the number of context words of the image as an input. The context may be referred as $C_I$ and the process 600a may further determine the one or more contextual keywords as an output. The process 600a may be performed by the contextual keyword determination engine 220.

The one or more contextual keywords may be interlinked to context words of the context by means of a conceptual-semantic and lexical relations. Given the context of the image, $C_I$, a vector of 'n' context words, the process 600a may include generating 'm' contextual keywords, $K_C$, such that m>n.

Thus, for generation of 'm' contextual keywords, synonyms, adjectives, related proverb/quotes and trending keywords may be generated from the limited 'n' context keywords.

Generation of the synonyms, the adjectives, the related proverb/quotes and the trending keywords may be done from a lexical database by using a basic dictionary mapping.

$$\begin{cases} \text{Thus, } K_C[j] = \text{Lexical Dictionary Mapping of } C_I[i], \\ \forall \, i < n, j < m, \text{ such that } m > n \end{cases} \quad \text{Equation 2}$$

Mathematically representing, $K_C[j] \triangleq$ Contextual Keywords, where $1 \le |j| \le m$;

$m$ is the number of Contextual Keywords.

Figure 6B:
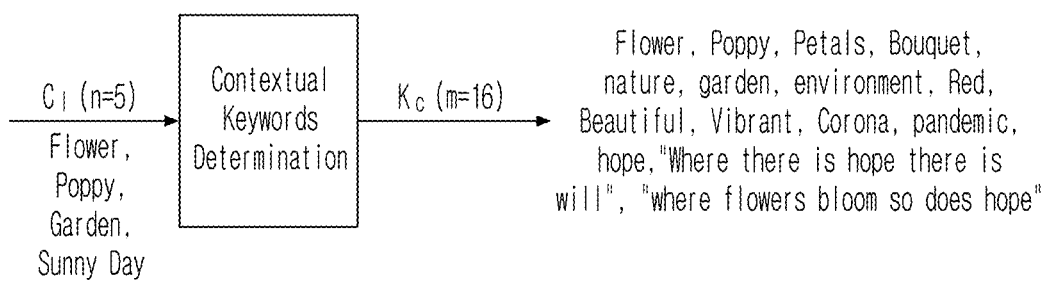
FIG. 6B illustrates an example diagram for determining the one or more contextual keywords of the image, in accordance with an embodiment.

FIG. 6B illustrates an example diagram 600b for determining the one or more contextual keywords of the image, in accordance with an embodiment. An output may be 'm' contextual keywords such that m>n. In the given example, the one or more contextual keywords may include a Flower, a Poppy, Petals, a Bouquet, nature, a garden, environment, (Synonyms), Red, Beautiful, Vibrant (adjectives) Corona, pandemic, hope (trending keywords) "Where there is hope there is will", "where flowers bloom so does hope" (Proverbs/Quotes).

Figure 7A:
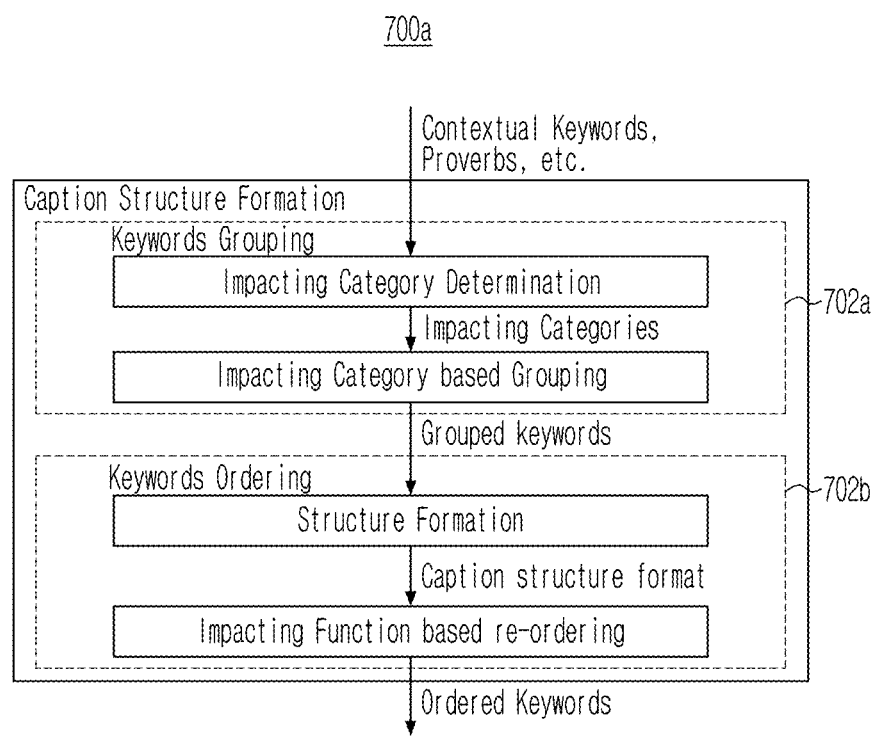
FIG. 7A illustrates an operational flow diagram depicting a process for forming a caption structure, in accordance with an embodiment.

FIG. 7A illustrates an operational flow diagram depicting a process 700a for forming a caption structure, in accordance with an embodiment. The caption structure may be formed by grouping one or more contextual keywords associated with an image in order to generate at least one caption for the image. Further, the one or more contextual keywords may be ordered so as to form the caption structure.

The caption-structure may further be utilized for generating a number of captions associated with the image. the process 700a may be performed by the impacting category determination engine 222, the impacting category-based grouping engine 224 and the re-ordering engine 226 as referred in the FIG. 2.

The process 700a may include receiving the one or more contextual keywords $K_C$ as an input and generating the caption structure with ordered one or more contextual keywords $C_S$ as an output.

At operation 702a, the process 700a may include performing keyword grouping on the one or more contextual keywords. The keyword grouping may be performed to group 'm' contextual keywords $K_C$ into 'M' impacting categories. Moving forward, the keyword grouping may include an impacting category determination and an impacting category-based grouping. The aim of the impacting category determination may be to determine the impacting categories of the one or more contextual keywords. The impacting categories $C_I$ may be defined as a sentimental impact that may be created on a user with respect to any keyword or text. Instances of the impacting categories may include a positive impact, a negative impact, an inspirational impact, a de-motivational impact, a neutral impact or the like.

The determination of the impacting categories may include classifying the one or more contextual keywords as adjectives, nouns, pronouns, adverbs, phrases, or the like. The classification may be done either by using a manual dictionary or by storing corresponding information alongside the one or more contextual keywords while determination of the one or more contextual keywords.

The one or more contextual keywords $K_C$ classified as the adjectives, proverbs, phrases, quotes, or the like, may include a meaningful sentimental impact. Thus, defining:

$$\begin{cases} K_S \triangleq \text{vector of sentimental keywords} \\ \quad \text{such that,} \\ K_S[j] = \text{sentimental keyword} \in K_C, \text{given } 1 \le j < m \end{cases} \quad \text{Equation 3}$$

Thus, processing only the sentimental keywords, $K_S$ may be required to determine the "impact" associated with the sentimental keyword, that may also be extended to the nouns/pronouns/other neutral keywords, $K_N \in K_C$, such that, $K_N \cup K_S = K_C$, which are directly or indirectly used for generation of the sentimental keywords, $K_S$.

The determination of the impacting categories associated with a particular sentimental keyword, $K_S$, may include using a sentimental library. The library contains a large set of words are hand scored by human coders according to the sentiments contained in those keywords. Given, a sentimental score ranging from −x to +x, for all sentimental keywords, $K_S$, the number of impact categories, M can be upper bounded as follows:

$$M \le x+1 \quad \text{Equation 4}$$

Thus, all the sentimental keywords, $K_S$, may be grouped into M impact categories, according to a respective sentimental score of the sentimental keyword. Also, neutral keywords $K_N$, may be grouped in same impact categories as their directly or indirectly linked sentimental keywords $K_S$.

$K_C$-$C_i$ Map

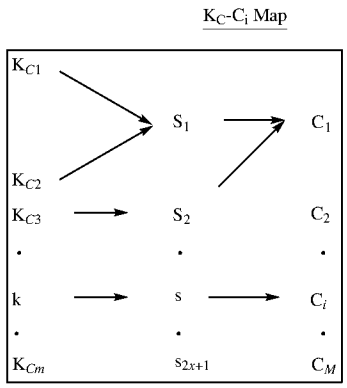

Thus, a keyword k∈ $K_C$ belongs to $i^{th}$ Impacting Category, $C_i$, if:

$$\begin{cases} s \in [l_1, l_2) \text{ where} \\ l_1 = -x + \dfrac{(2x+1) \times (i-1)}{M}, \\ \text{and } l_2 = -x + \dfrac{(2x+1) \times (i)}{M}, 1 \le i \le M; \\ \text{where, } s \text{ is the sentimental score} \\ \text{corresponding to the keyword } k, \\ -x \le s \le +xx \text{ is the minimum} \\ \text{value possible for } |s|. \\ \text{Typically, } x \le 5\,M \text{ is the number} \\ \text{of impact categories} \end{cases} \quad \text{Equation 5}$$

Further, the keyword ordering may also include an impacting category-based grouping. The aim of "Impacting Category based Grouping" is to group the one or more contextual keywords into 'M' Categories.

Based on the $K_C$–$C_i$ map, the one or more contextual keywords, $K_C$ may be grouped as given, 1≤i≤M, 1≤j≤m, $$\begin{cases} K_G \triangleq \text{vector of } M \times m \text{ Grouped Keywords, where,} \\ K_G[i] \triangleq \text{vector of } 1 \times m \text{ Keywords} \\ \text{corresponding to } i\wedge th \text{ Impacting Category} \\ \text{such that } K_G[i][j] = k, \text{ where } k \in K_C \text{ and } k \in C_i \end{cases} \quad \text{Equation 6}$$

Thus, a M×m vector of the grouped one or more contextual keywords is generated based on Impacting Category $C_i$ of a keyword k E $K_C$.

At operation 702b, the process 700a may include performing keyword ordering on the one or more contextual keywords upon grouping of the one or more contextual keywords. The keyword ordering may include the structure formation and an impacting function-based re-ordering. The aim of the structure formation may be to form a definite caption structure format. Grouped contextual keywords represented as Kc, $K_G$, that are grouped may be required to be placed in the caption structure format as shown:

$C_S = $ | ... | ... | ... | | ... |
P1  P2  P3   ...  PM

Thus, the Caption Structure Format is defined as a vector of m×M keywords as follows:

$$\begin{cases} C_S \triangleq \text{Caption Structure Format, such that} \\ C_S[p_i] = K_G[j], \text{ where } p_i \text{ represents the} \\ \quad i^{th} \text{ position of } C_S \\ \text{Given, } 1 \le p_i \le M, 1 \le i, j \le M \end{cases} \quad \text{Equation 7}$$

The relation between p_i and j in above caption structure format is determined by using the impacting function in the next operation.

Continuing with the above embodiment, an arrangement of the one or more contextual keywords that are grouped in the caption structure format may be done according to the predefined impacting function. The predefined impacting function may be defined as a function of expected sentimental scores with respect to a position in the caption structure. Mathematically, $$\begin{cases} \text{given, } -x \le e_{si} \le +x, 1 \le p_i \le M, 1 < i < M \quad \text{Equation 8}\\ \text{Impacting Function} \triangleq \int (e_{si}, p_i) \\ \text{where,} \\ p_i \text{ is the } i^{th} \text{ position of Caption Structure Format,} \\ x \text{ is the maximum possible value for } |e_{si}|, e_{si} \text{ is the} \\ \text{expected sentimental scores at } p_i \end{cases}$$

Figure 17:
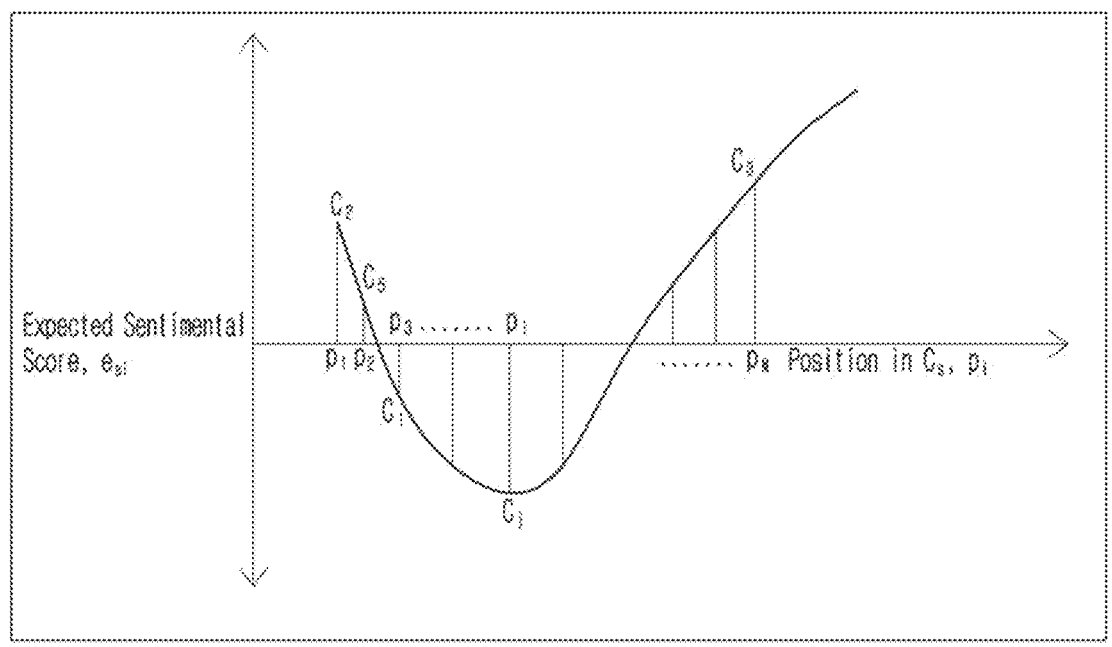
FIG. 17 illustrates an example of impacting function.

An example of impacting function is a parabolic relation between $e_{si}$ and $p_i$ as shown in the graphical representation of FIG. 17, where:

Mathematically, f($e_{si}$, $p_i$) is defined as following for parabolic relation:

$e_{si} = a(p_i - h)^2 + k,$

Equation is valid only for the given ranges of:

$-x \le e_{si} \le +x, 1 \le p_i \le M, 1 < i < M$

Thus, for a given impacting function, based on the size of caption structure $C_S$, that is M, the one or more contextual keywords $K_G$ that are grouped may be placed according to the following relation:

Assign $K_G[j]$ (Keywords corresponding to $j^{th}$ impacting Category $C_j$), a position $p_i$ in the Caption Structure Format, if the expected sentimental score at position $p_i$ satisfies the following relation:

$$\begin{cases} e_{si} \in (l_1, l_2), \\ l_1 = -x + \dfrac{(2x+1) \times (j-1)}{M} \text{ and,} \\ l_2 = -x + \dfrac{(2x+1) \times (j)}{M}, 1 \le i, j \le M \end{cases} \quad \text{Equation 9 \& 10}$$

Thus, the one or more contextual keywords $K_G[j]$ may be placed at position $p_i$ based on above equation in the Caption Structure Format as shown:

$C_S = $ | $K_G[2]$ | $K_G[5]$ | $K_G[1]$ | ... | $K_G[j]$ | ... | $K_G[3]$ |
P1  P2  P3  ...  P$_i$  ...  PM

The process 700a may be configured to group the one or more contextual keywords of a media such as the image into one or more impacting categories, and then rearrange an order of the one or more contextual keywords using a pre-defined impacting function to form the caption structure.

In other words, the objective of caption structure formation may be to generate the number of captions of said "impact as represented by the impacting function".

For instance, a parabolic impacting function may imply creating a caption starting with a positive impact on a reader, then leaves a negative impact (or less positive impact) but ends in leaving inspiration impact on the reader.

Figure 7B:
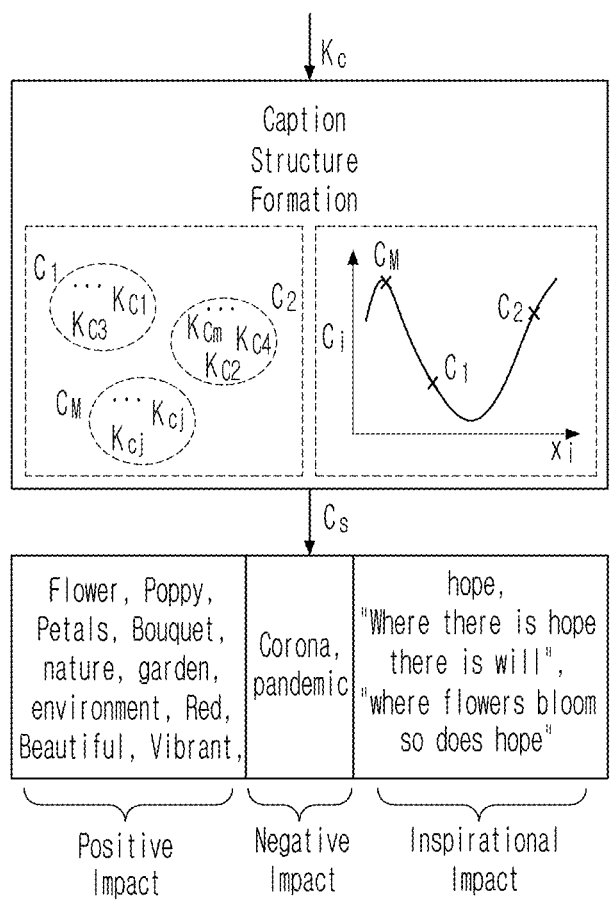
FIG. 7B illustrates an example diagram for forming the caption structure, in accordance with an embodiment.

FIG. 7B illustrates an example diagram 700b for forming the caption structure, in accordance with an embodiment. The one or more contextual keywords may be grouped according to their impact as positive, negative or inspirational. Further, the one or more contextual keywords upon being grouped may be re-arranged to create the parabolic impact on the reader.

Figure 7C:
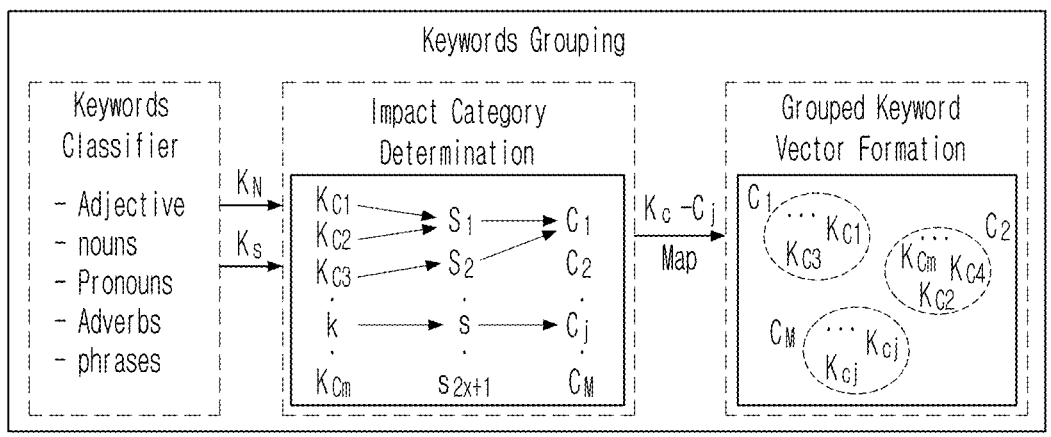
FIG. 7C illustrates an example diagram depicting the impacting category-based grouping of the one or more contextual keywords, in accordance with an embodiment.

FIG. 7C illustrates an example diagram 700c depicting the impacting category-based grouping of the one or more contextual keywords, in accordance with an embodiment. In an example embodiment, "Flower, Poppy, Petals, Bouquet, nature, garden, environment, Red, Beautiful, Vibrant, Corona, pandemic, hope, "Where there is hope there is will", "where flowers bloom so does hope"" may be the one or more contextual keywords and the one or more contextual keywords may be divided into a positive impact, a negative impact, and an inspirational impact.

Figure 7D:
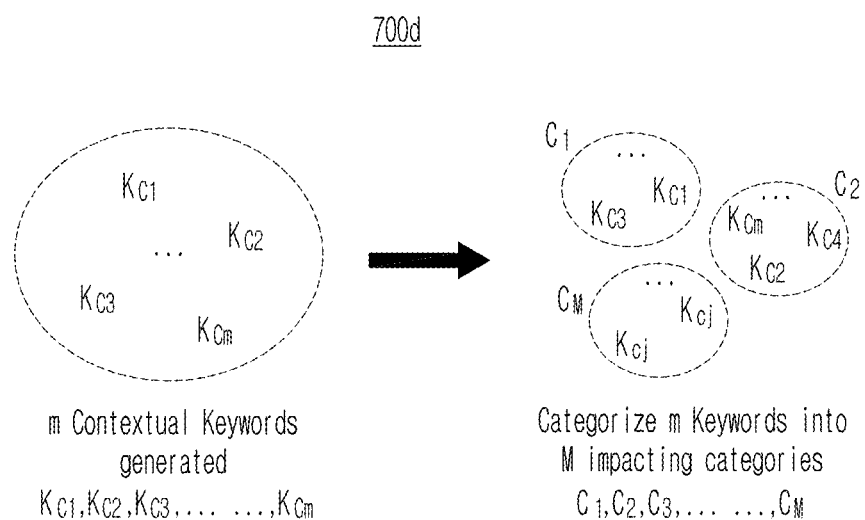
FIG. 7D illustrates a diagram depicting a impacting category based grouping, in accordance with an embodiment.

FIG. 7D illustrates a diagram 700d depicting an impacting category-based grouping, in accordance with an embodiment. In an embodiment, the aim of "Impacting Category based Grouping" may be to group the one or more contextual keywords into 'M' Categories. The one or more contextual keywords may be amongst $K_{C1}, K_{C2}, K_{C3}, \ldots, K_{Cm}$. Further, the 'M' categories may be $C_1, C_2, C_3, \ldots, C_M$.

Figure 7E:
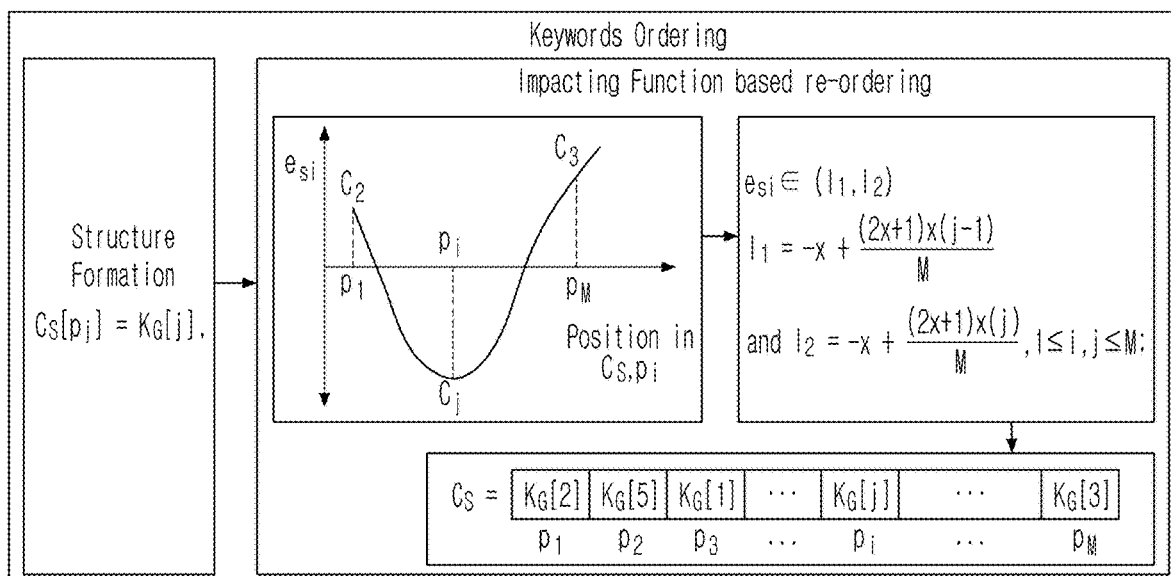
FIG. 7E illustrates an example diagram depicting the impacting function-based re-ordering of the one or more contextual keywords, in accordance with ai embodiment.

FIG. 7E illustrates an example diagram 700e depicting the impacting function-based re-ordering of the one or more contextual keywords, in accordance with an embodiment. The one or more contextual words grouped in the FIG. 7C are re-ordered based on the positive impact, the negative impact and the inspirational impact.

Figure 8:
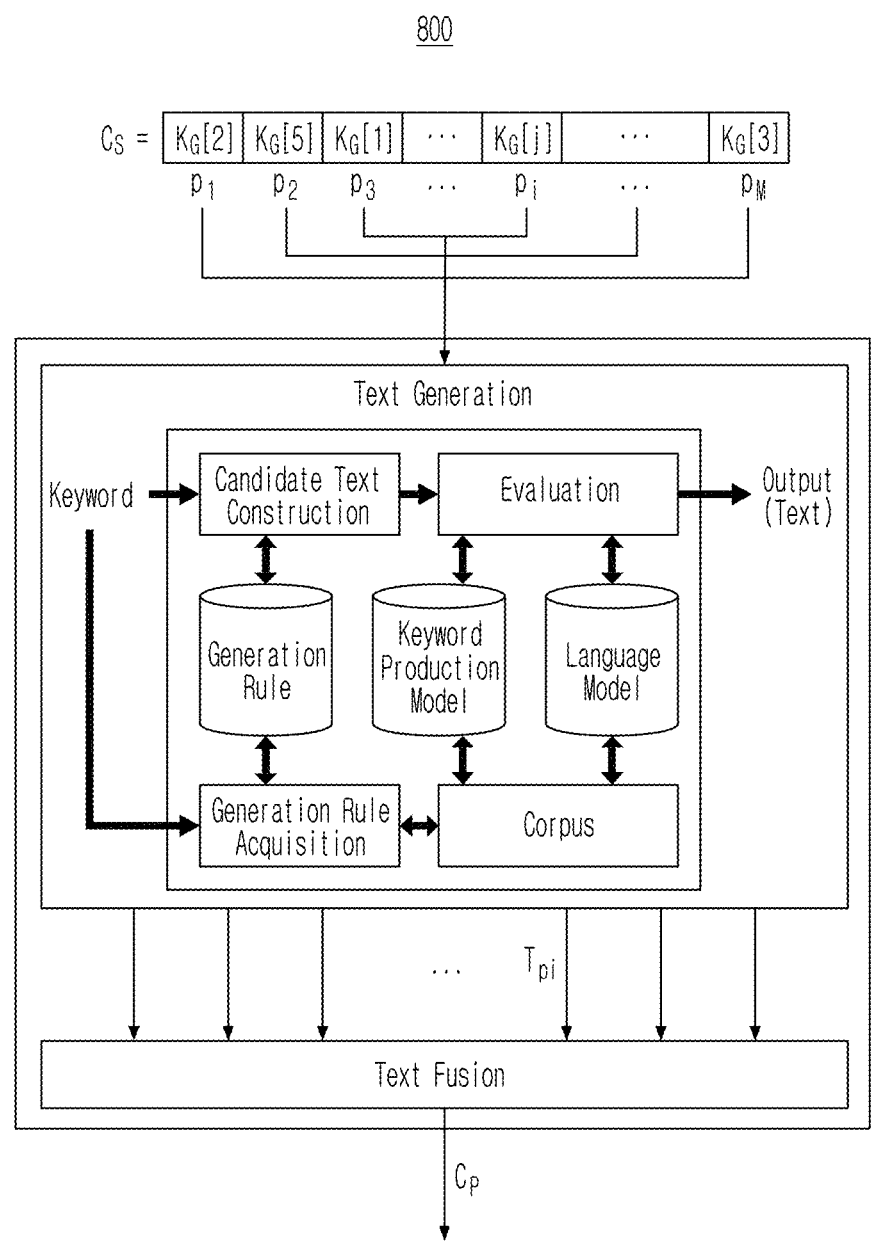
FIG. 8 illustrates an operational flow diagram depicting a process for generating a number of captions associated with an image, in accordance with an embodiment.

FIG. 8 illustrates an operational flow diagram depicting a process 800 for generating a number of captions associated with an image, in accordance with an embodiment. The number of captions may be generated by the caption generation engine 228 as referred in the FIG. 2. The process 800 may include receiving a caption structure with ordered one or more contextual keywords Cs as an input and generating the number of captions Cp as an output.

The number of captions may be generated from the caption structure with ordered one or more contextual keywords, $C_S$. Generating the number of captions may include a text generation and a text fusion.

Figure 18:
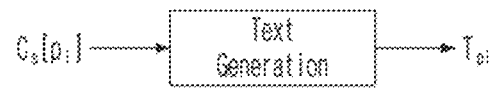
FIG. 18 illustrates text generation.

For the text generation, an aim is to generate sentences from a given input of group of keywords (or bag of words). Thus, given, $1 \leq p_i \leq M$, $1 \leq i,j \leq M$, for all $p_i$, the text generation is shown in FIG. 18, where:

$p_i$ represents the $i^{th}$ position of Caption Structure, $C_S$
$T_{pi}$ represents the text(s) generated for Grouped keywords $K_G[j]$ present at $C_S[p_i]$. The text generation may include a generation rule acquisition, candidate text construction utilizing language models. Other commonly used solution like N-gram model, GPT-2, or the like maybe used as well for the text generation.

Continuing with the above embodiment, the text fusion may include fusing incoming text(s), a given pair of $T_{pi}$'s (text(s) generated for the grouped one or more contextual keywords $K_G$ [j] present at $C_S[p_i]$), sentence fusion is performed on it. The text fusion may include joining two sentences with appropriate discourse connectives.

Figure 19:
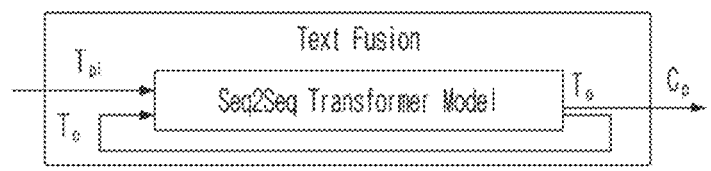
FIG. 19 illustrates text fusion.

A transformer based seq2seq model may also be used for the text fusion. An aim of the text fusion is to choose an appropriate connector given two sentences. The text fusion as described above not only analyzes a discourse semantic between input sentences but also syntactic role of any noun/pronoun. For incoming M sentences, Caption is formed as shown in FIG. 19 where:

$T_{pi}$ represents the text(s) generated, $1 < p_i \leq M$, $$T_o = \begin{cases} T_{p1}, o = 1 \\ \text{Output of Transformer Model, } 1 < o < M \end{cases},$$

$C_P$ are the caption(s) formed, i.e., output of last pair of sentence fusion, so:

$$C_P = T_{o=M}$$

Figure 9A:
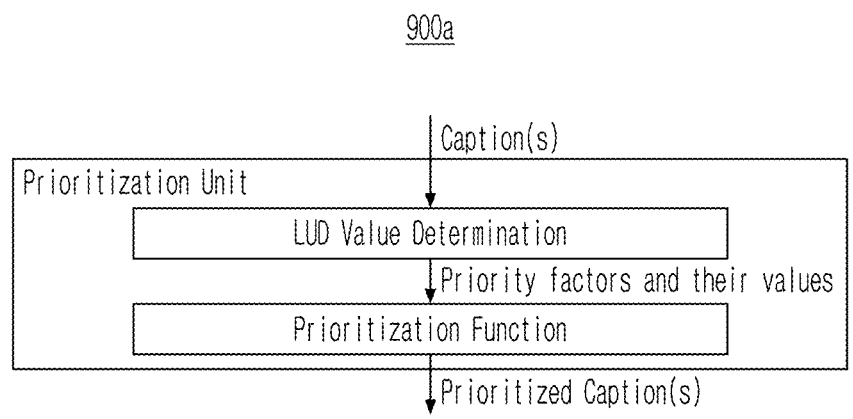
FIG. 9A illustrates an operational flow diagram depicting a process for determining a priority value associated with a number of captions associated with an image, in accordance with an embodiment.

FIG. 9A illustrates an operational flow diagram depicting a process 900a for determining a priority value associated with a number of captions associated with an image, in accordance with an embodiment. The priority value may be determined by the priority engine 230 as referred in the FIG. 2. The process 900a may include receiving the number of captions, Cr as an input and generating a prioritized array of the number of captions, $C_P$' The process 900a may include performing a prioritization logic. The prioritization logic may include a LUD value determination, and a prioritization function. The LUD value determination may include determining three values associated with the number of captions and/or one or more contextual keywords associated with the number of captions. The three values include a linguistic value (L), a user profile value (U), and a sentiment difference value (D).

The prioritization function may include using the three values L, U and D as determined to calculate a weighted priority value. The weighted priority value may be required to order the generated number of caption(s) $C_P$ in a descending order of the priority value. Thus, the ordered number of caption(s) $C_p$' may contain prioritized captions for a suggestion to a user. The prioritized captions may be, thus, suggested to the user. Based on a usage of the user, a feedback of the user may also be taken into account apart from mentioned parameters.

Figure 9B:
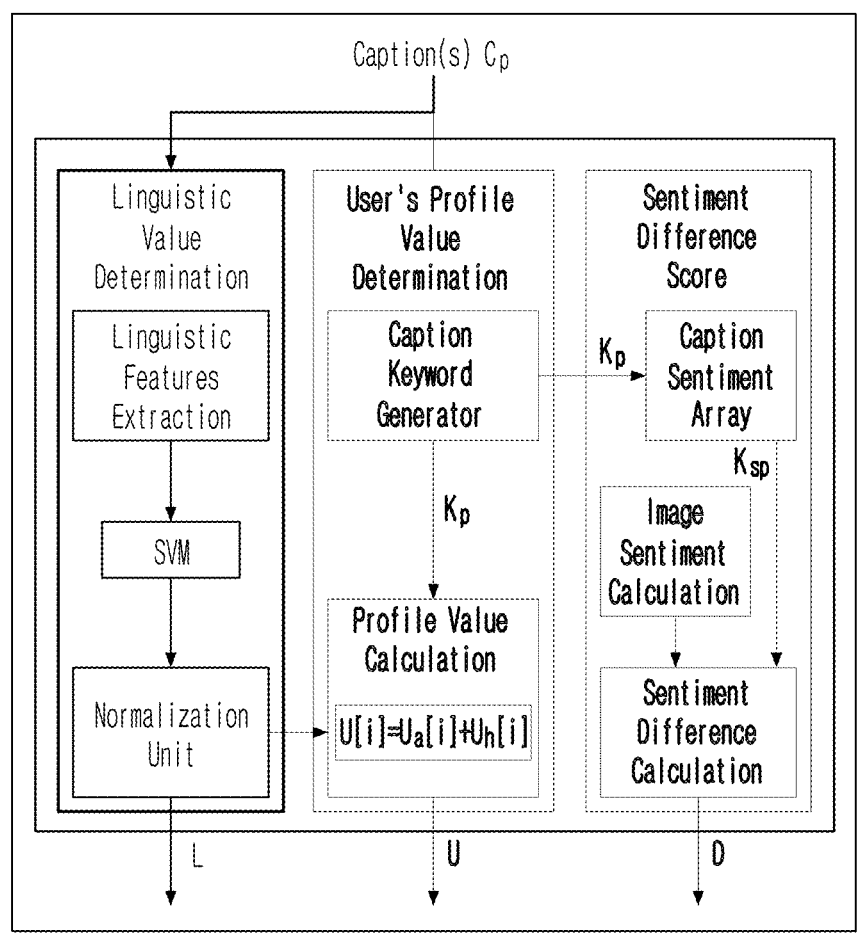
FIG. 9B illustrates an operational flow diagram depicting a process for determining the linguistic value, in accordance with an embodiment.

FIG. 9B illustrates an operational flow diagram depicting a process 900b for determining the linguistic value, in accordance with an embodiment.

The linguistic value (L) of any caption $C_p[i]$ from the number of captions may be determined based on a complexity of the caption along with a linguistic point-of-view of each associated keywords.

The complexity of a sentence may be determined using NLP tools to extract linguistic features from a text. One such widely used method involves a SVM Model. In an embodiment, a categorization based on lexical features, morphological features, raw text features, morpho-syntactic features, syntactic features and discursive features is done to determine the linguistic complexity. Further a normalized value between 0-1 may be generated by assigning difficulty levels a score between 0-1 (1 being the most difficult) and scoring based on that. Thus, for every caption $C_p[i]$, a Linguistic value L[i] is generated.

Figure 9C:
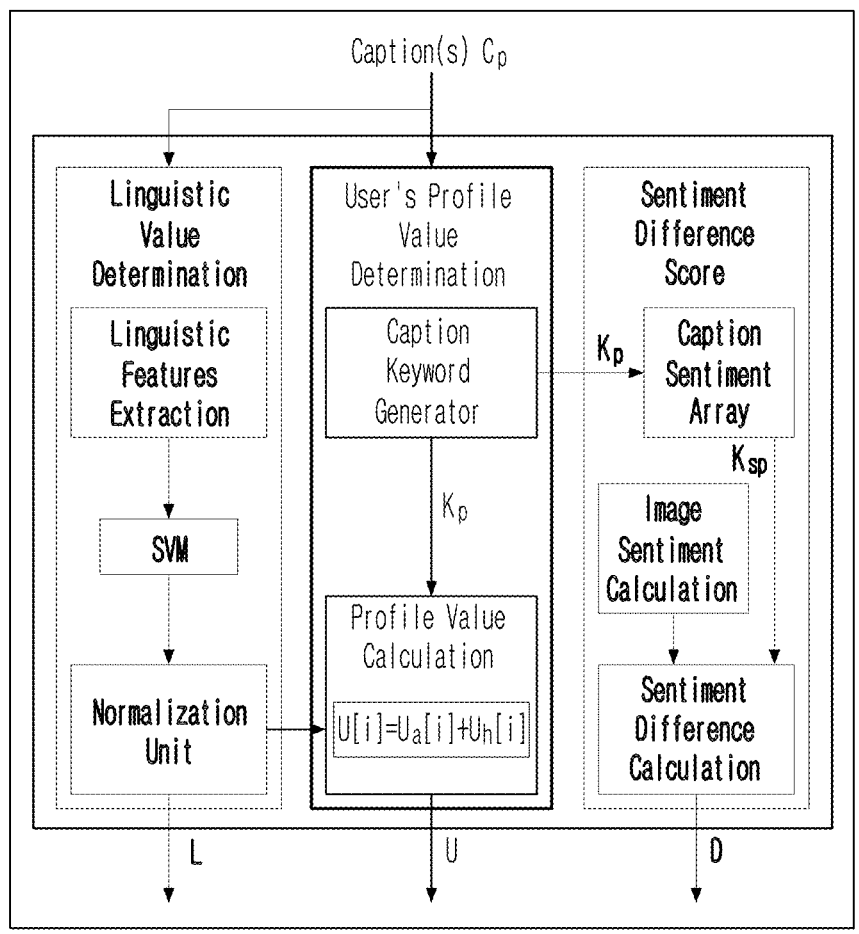
FIG. 9C illustrates an operational flow diagram depicting a process for determining the user profile score, in accordance with an embodiment.

FIG. 9C illustrates an operational flow diagram depicting a process 900c for determining the user profile score, in accordance with an embodiment. The process 900c may include generating a caption keyword and calculating a profile value. Keywords $K_P$, classified as adjectives, proverbs, phrases, quotes, having a meaningful sentimental impact may be extracted from the number of captions, $C_p$.

To determine the user profile score, the linguistic Value L and the caption keywords, $K_P$, may be used to find $U_a$ and $U_h$ as follows:

Age based scoring ($U_a$): The age-based scoring may be dependent on the linguistic value (L) of the caption. A weight ($w_a$) inversely proportional to age (a) is taken as the coefficient for the score. Mathematically, age-based score for $i^{th}$ Caption is defined as follows:

$$\left\{ U_a[i] = -w_a * L[i], \text{ where } w_a = \frac{1}{a} \forall\, a \geq 1 \right. \qquad \text{Equation 11}$$

Hobbies based scoring ($U_h$): A list of user hobbies (H) is maintained. Every keyword in $K_P$ is scored against every hobby using a similarity function to score. Given $n_H$ number of hobbies and $n_K[i]$ number of keywords in $i^{th}$ Caption, hobby-based score for $i^{th}$ Caption is defined as follows:

$$\left\{ U_h[i] = \frac{1}{n_H n_K[i]} * \sum_{n=0}^{n_H} \sum_{m=0}^{n_K[i]} Sim(H[n], K_p[i][m]) \right. \qquad \text{Equation 12}$$

The similarity score between words may further be calculated and the total User Profile Score for $i^{th}$ caption is: $U[i]=U_a[i]+U_h[i]$.

Figure 9D:
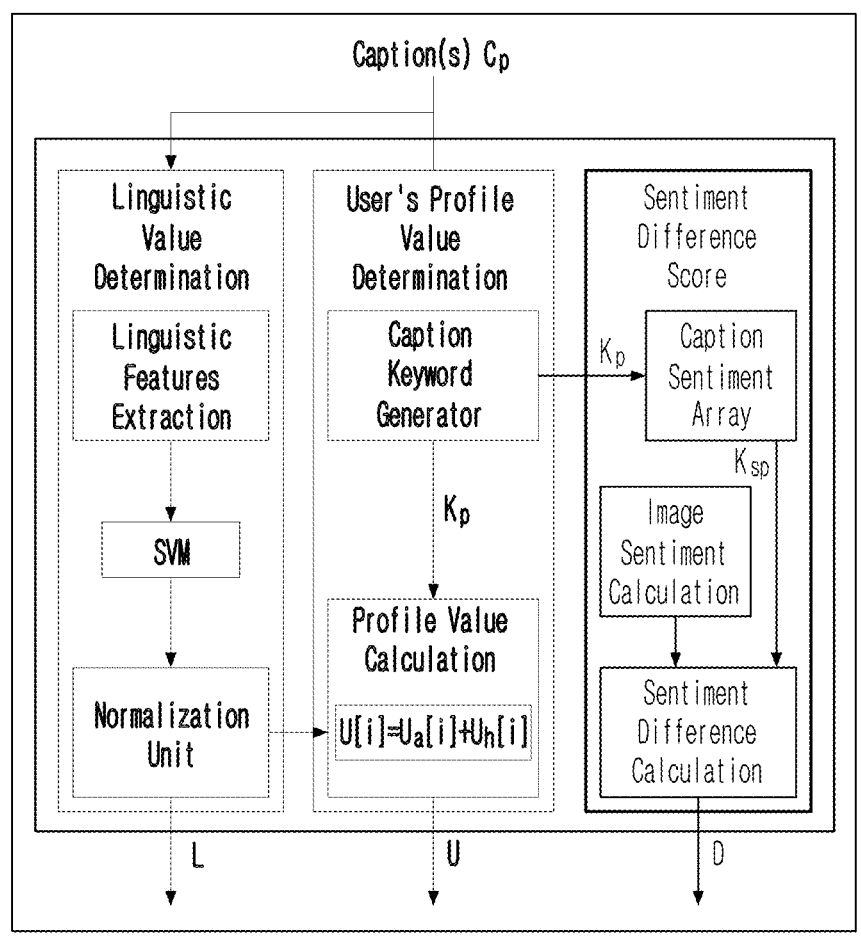
FIG. 9D illustrates an operational flow diagram depicting a process for determining the sentiment difference score, in accordance with an embodiment.

FIG. 9D illustrates an operational flow diagram depicting a process 900d for determining the sentiment difference score, in accordance with an embodiment. The process 900d may include a caption sentiment array, an image sentiment calculation, and a sentiment difference calculation.

The caption sentiment array may be used to determine a sentiment value associated with any Caption. The sentiment value is determined by using the caption keywords $K_p$. In order to calculate the sentiment attached to the keyword the earlier used method of determining the sentiment associated with a keyword using Sentiment library is used. A keyword sentiment value list ($K_{sp}$) may be generated for each of the number of captions. Caption sentiment, $S_p$ value is generated by taking weighted sum of the sentiment values of all the keywords in the caption.

The caption sentiment value for any $i^{th}$ caption is determined as follows:

$$\left\{ \begin{array}{l} S_p[i] = \frac{1}{N} \sum_{n=0}^{N} K_{sp}[i][n], \\ \text{where } n_K = \text{total number of} \\ \text{keywords in } i^{th} \text{ Caption} \end{array} \right. \qquad \text{Equation 13}$$

Further, an image sentiment may be calculated by taking the weighted sum of sentiments of the keywords associated with the image. The context words of image ($C_I$) extracted during a context determination may be used again.

The keywords may be passed through the impacting category determination engine 222 determine the sentiment attached with these keywords ($S_c$). Finally, a weighted sum of sentiments of all keywords may be taken as an image sentiment value.

Thus, Mathematically, the image sentiment value, $I_p$ the image may be calculated as follows:

$$\left\{ \begin{array}{l} I_p = \frac{1}{n} \sum_{i=0}^{n} S_c[i] \\ \text{where } n = \text{total number of keywords generated} \\ \text{from context of Image, } C_I \end{array} \right. \qquad \text{Equation 14}$$

Furthermore, the sentiment difference, D may be calculated from the caption sentiment, $S_p$ and image sentiment value, $I_p$, following relation is used:

$$\left\{ \begin{array}{l} D[i] = \frac{1}{d}|S_p[i] - I_p| \\ \text{where, } S_p[i] \text{ represents Sentiment of } i^{th} \text{ Caption,} \\ D[i] \text{ represents the Sentiment Difference score for} \\ i^{th} \text{ Caption, } d \text{ is the normalization factor. Typically,} \\ d \leq 10 \end{array} \right. \qquad \text{Equation 15}$$

The linguistic value may be a measure of a toughness of the suggested caption. Further, based on user's age and hobbies, the user's profile score may be a measure of a user's capability (age versus linguistic value) and user's interests (hobbies versus caption keywords). Moreover, the sentiment difference may be a measure, of alignment of suggested caption with respect to the image. The sentiment conveyed by image must be preserved in the caption.

Figure 9E:
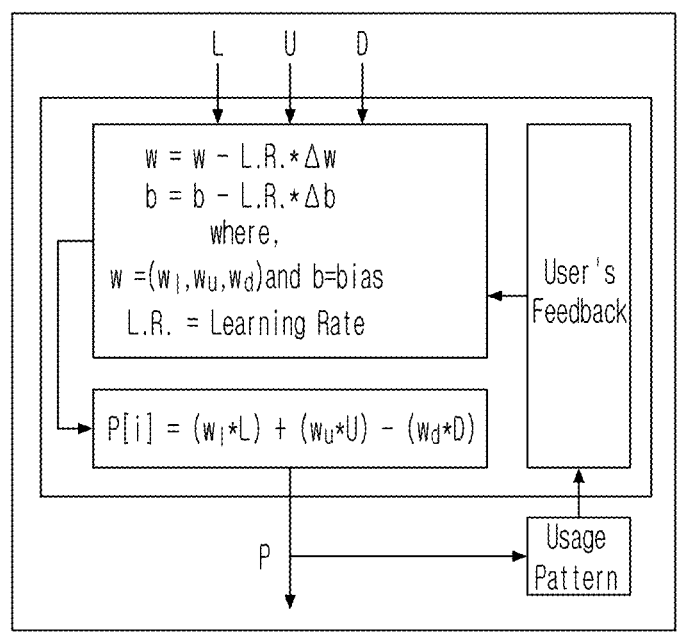
FIG. 9E illustrates an operational flow diagram depicting a process for determining the priority value for each caption from the number of captions by using the prioritization function, in accordance with an embodiment.

FIG. 9E illustrates an operational flow diagram depicting a process 900e for determining the priority value for each caption from the number of captions by using the prioritization function, in accordance with an embodiment. The LUD values may be used in the prioritization function to generate the priority value (P) for every caption present in the caption array. The captions may further be maintained as a priority list and the prioritized array may be returned. The priority function $P_f$(L, U, D) is weighted sum of the score values. The weights may be initialized and further modified using user's feedback data to improve the caption prioritization for future captions. For any $i^{th}$ caption the priority (P[i]) can be calculated as follows:

$$\{P[i] = (w_l * L) + (w_u * U) - (w_d * D) \qquad \text{Equation 16}$$

Each of the L, U and D may be given a predetermined weight $w_l$, $w_u$ and $w_d$ respectively for every user. The weights may be determined using a basic gradient descent model. A basic value for these weights are decided for all captions such that:

$$w_l + w_u + w_d = 1$$

$$w_l, w_d > = w_u$$

$$w_l + w_d > = 0.75$$

The values may be further fine-tuned using the basic gradient descent model for each user. Sample text for captions may be used to train the model and fine tune the values.

The values may also be further tuned from the feedback received, generating a personalized priority weight value for each user. The priority calculated is now used to sort the captions. A caption having higher priority value appears earlier than others, i.e., $$\begin{cases} C\_P^{\wedge'}[i] = C\_P[j], \text{Given, Priority of } C\_P^{\wedge'}[i] > \\ \quad [\text{Priority of } C]\_P^{\wedge'}[i+1], \\ \quad 1 \le i, j < n\_C \\ \text{where } n_C \text{ is the number of captions suggested} \\ \quad \text{to the user} \end{cases} \quad \text{Equation 17}$$

Figure 10:
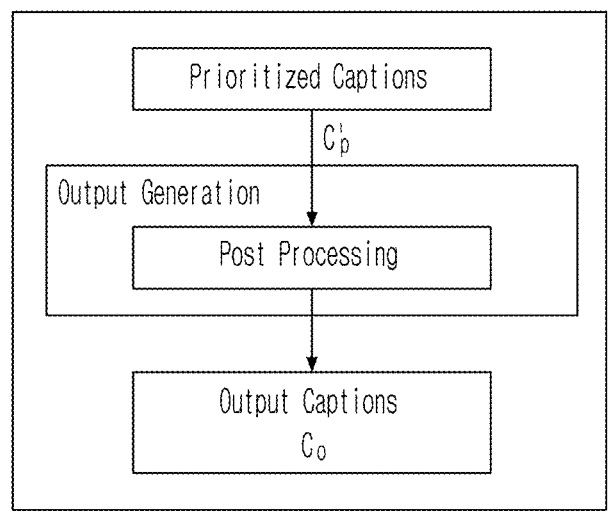
FIG. 10 illustrates an operational flow diagram depicting a process for an output generation with respect to an image, in accordance with an embodiment.

FIG. 10 illustrates an operational flow diagram depicting a process 1000 for an output generation with respect to an image, in accordance with an embodiment. The output may be generated by the modification engine 232 as referred in the FIG. 2. A generated few prioritized caption also referred as at least one caption may further be modified with a post-processing to change the at least caption according to a user's requirement. In an embodiment, the user may choose to generate a counterfactual of the at least one caption changing a gender of a subject or a speaker. The process 1000 may include receiving a user input for choice (or selection) to generate a counterfactual of the at least one caption changing a gender of a subject or a speaker. This may be achieved using a gender encoder. In another embodiment, the generated sentence may be modified to convert an active voice to a passive voice and vice versa. The post processing may be an open block and many more modifications may be added to enhance the generated captions as per requirements and technological advancements.

Figure 11A:
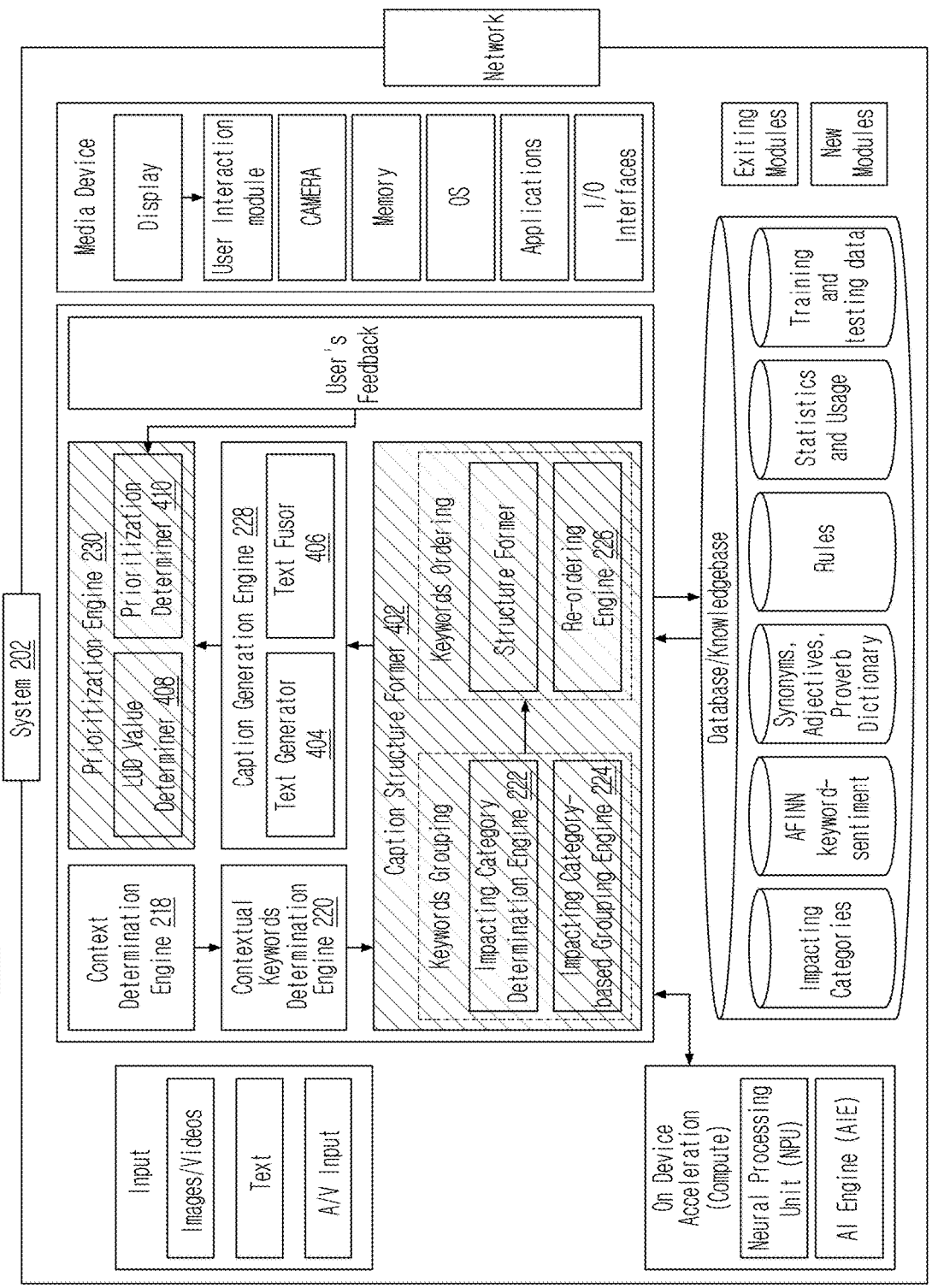
FIG. 11A illustrates another embodiment of the architectural diagram depicting a method for suggesting at least one caption for an image, in accordance with an embodiment.

FIG. 11A illustrates another embodiment of the architectural diagram 400 depicting a method for suggesting at least one caption for an image, in accordance with an embodiment. The architectural diagram may include the context determination engine 218, the contextual keywords determination engine 220, a caption structure former 402, the caption generation engine 228, and the prioritization engine 230. The caption structure former 402 may include the impacting category determination engine 222, the impacting category-based grouping engine 224, and the re-ordering engine 226. The caption generation engine 228 may include a text generator 404, and the text fuser 406. The prioritization engine 230 may include a LUD value determiner 408, and the prioritization determiner 410. An input may be received for generating at least one caption. The input may be text or any Audio/Video (A/V) input. The text may include text inputted by a user or extracted from a document or a web link. The context determination engine 218 may process the input based on a type of the input.

Figure 11B:
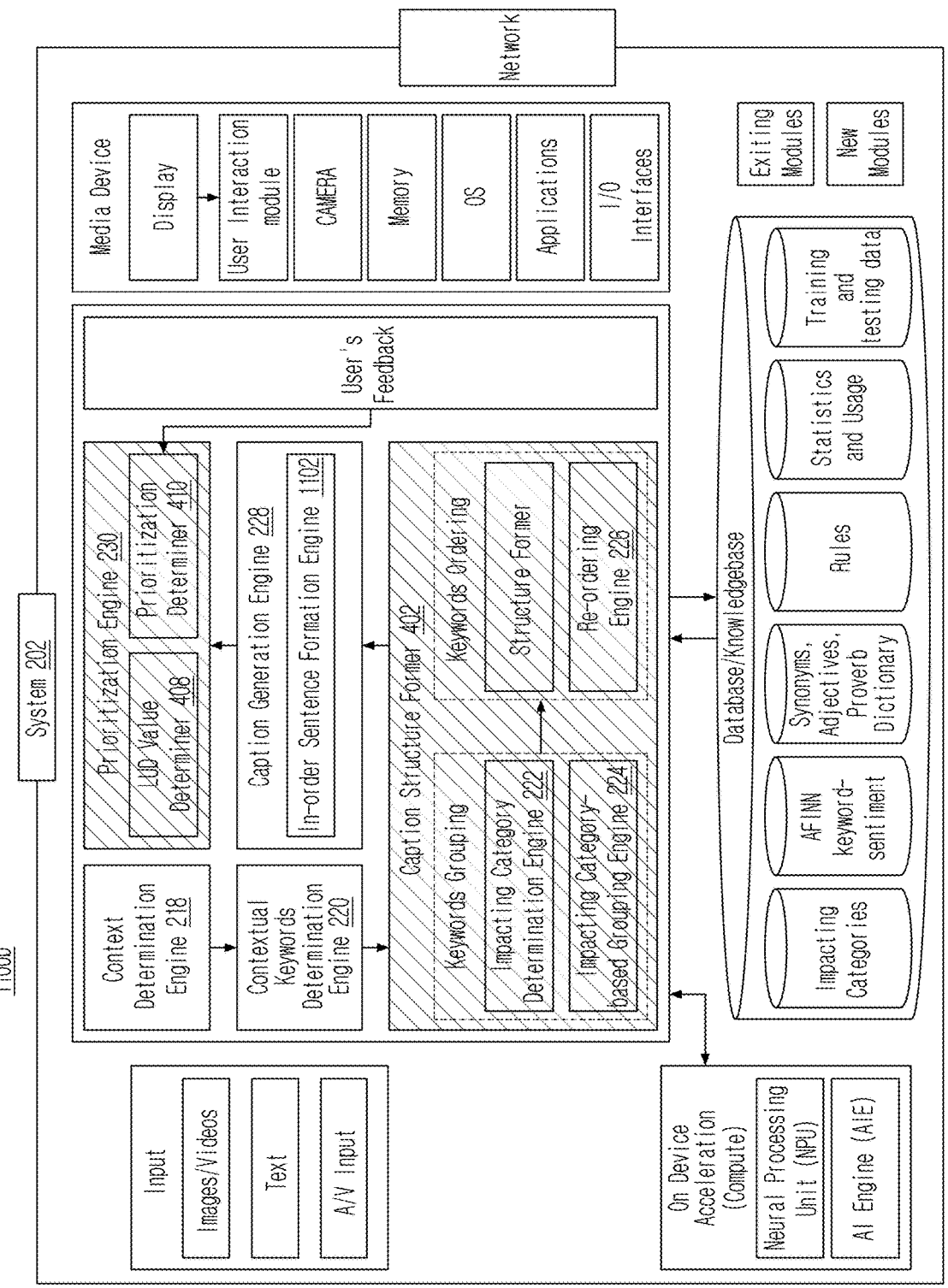
FIG. 11B illustrates yet another embodiment of an architectural diagram depicting a method for suggesting at least one caption for an image, in accordance with an embodiment.

FIG. 11B illustrates yet another embodiment of an architectural diagram 400 depicting a method for suggesting at least one caption for an image, in accordance with an embodiment. The caption generation engine 228 may include an "in-order sentence formation" engine 1202. The in-order sentence formation engine 1202 may be configured to form a sentence from inputted keywords while maintaining an order of groups of keywords used in the sentence. Further, GPT-2 and few transformer-based models may be capable of generating long sentences or summaries.

Figure 11C:
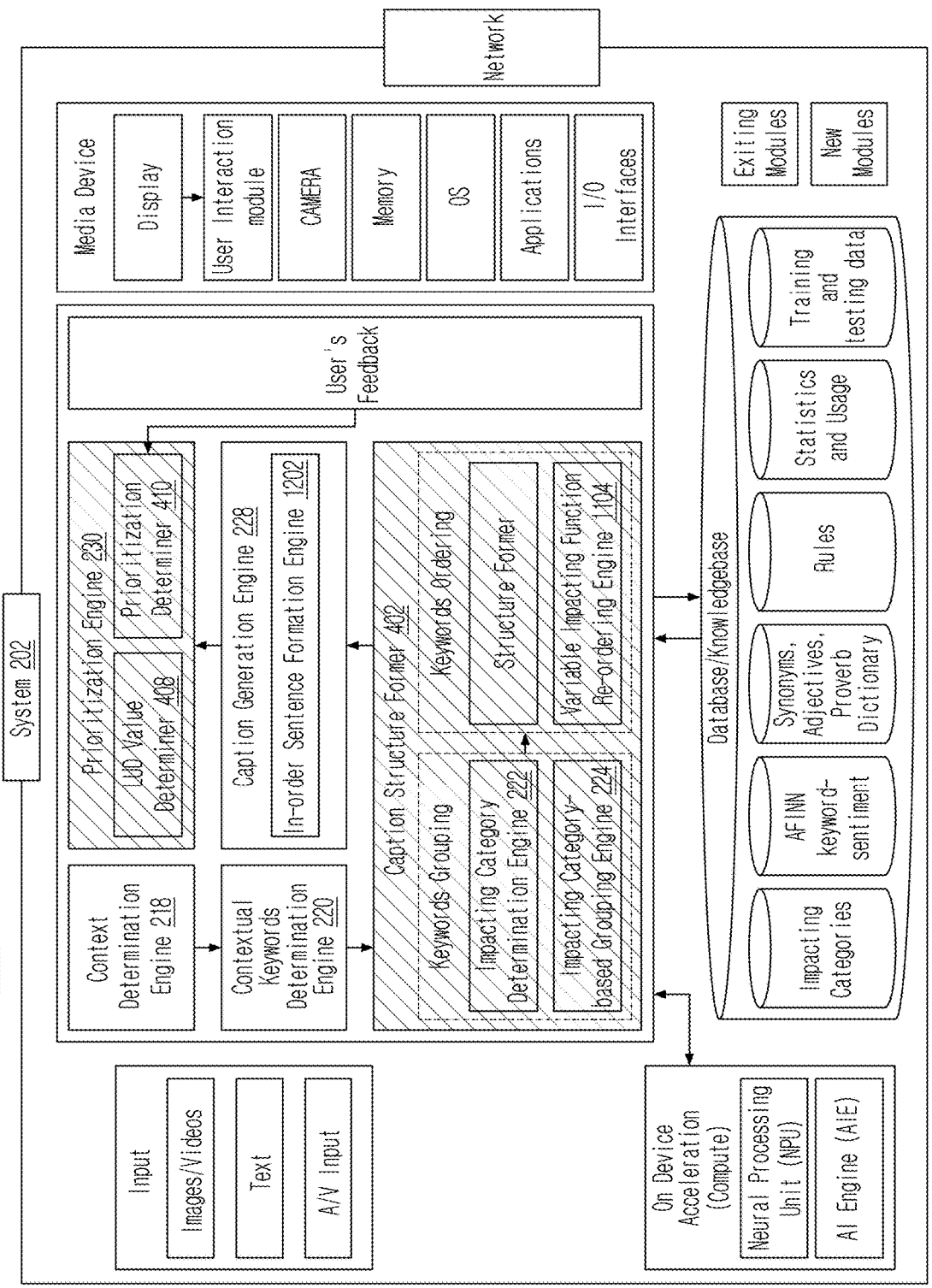
FIG. 11C illustrates yet another embodiment of the architectural diagram depicting a method for suggesting at least one caption for an image, in accordance with an embodiment.
Figure 12A:
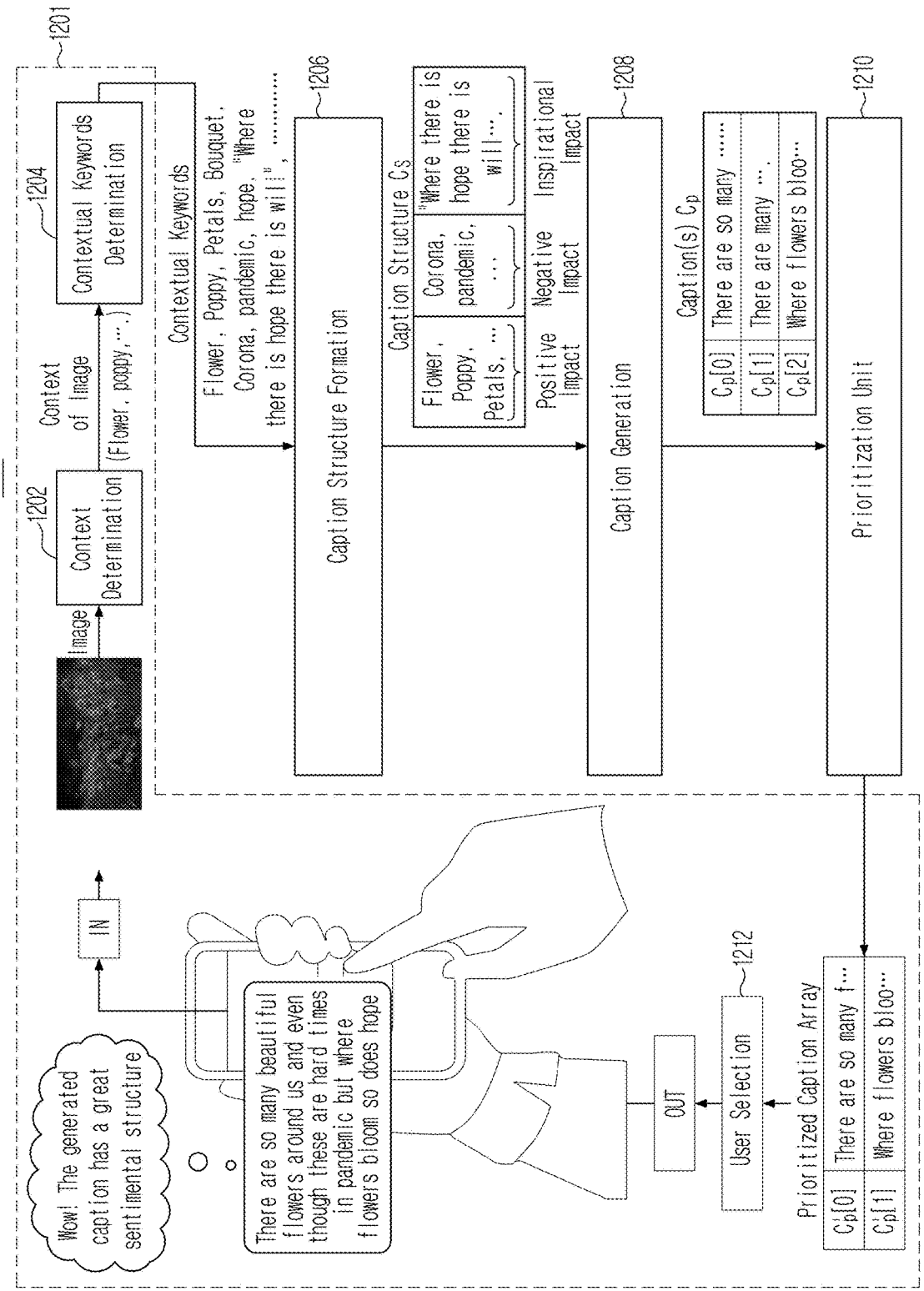
FIGS. 12A-12D illustrate a use case diagram depicting a caption generation for an image, in accordance with an embodiment.
Figure 12B:
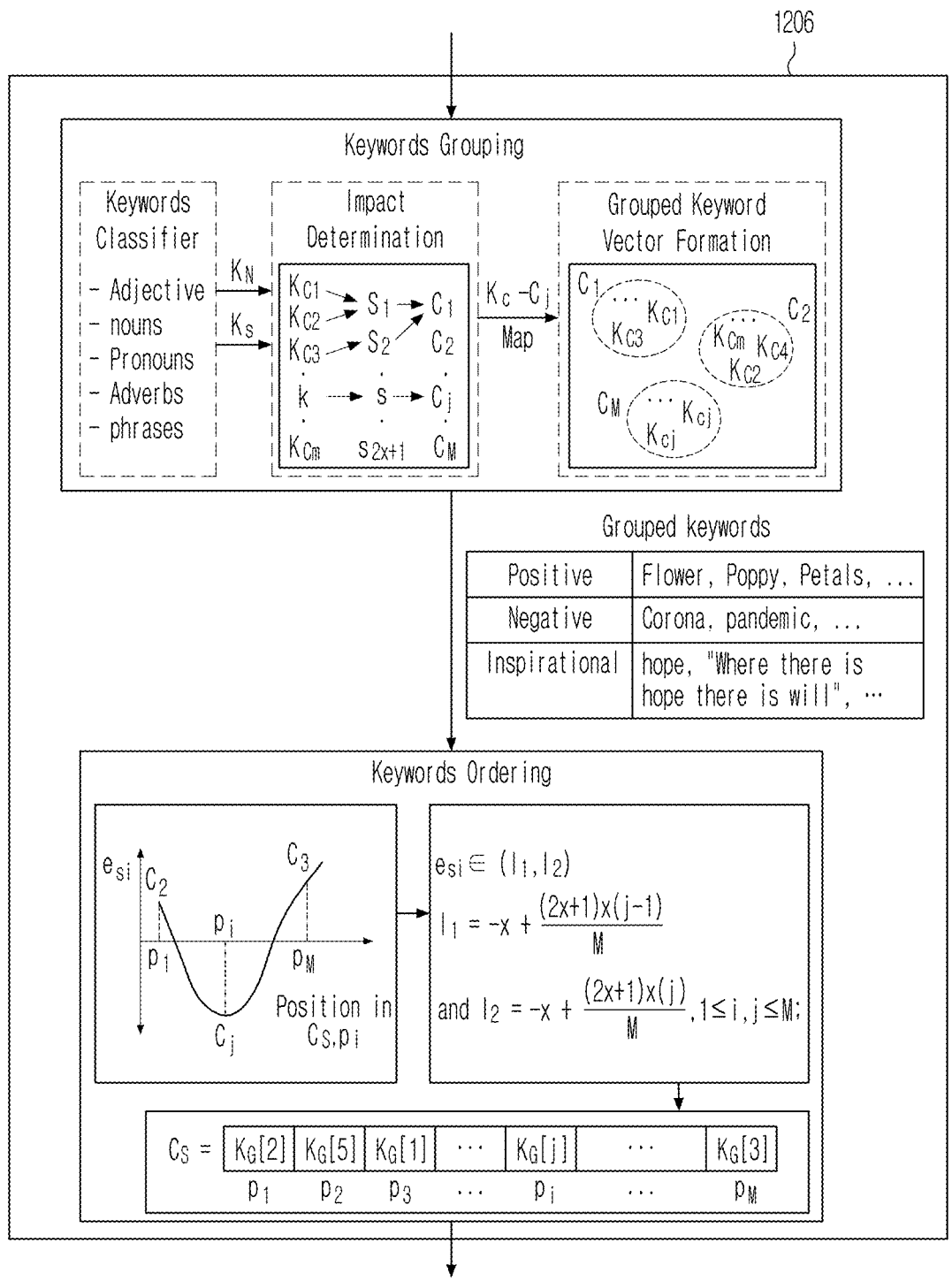
Figure 12C:
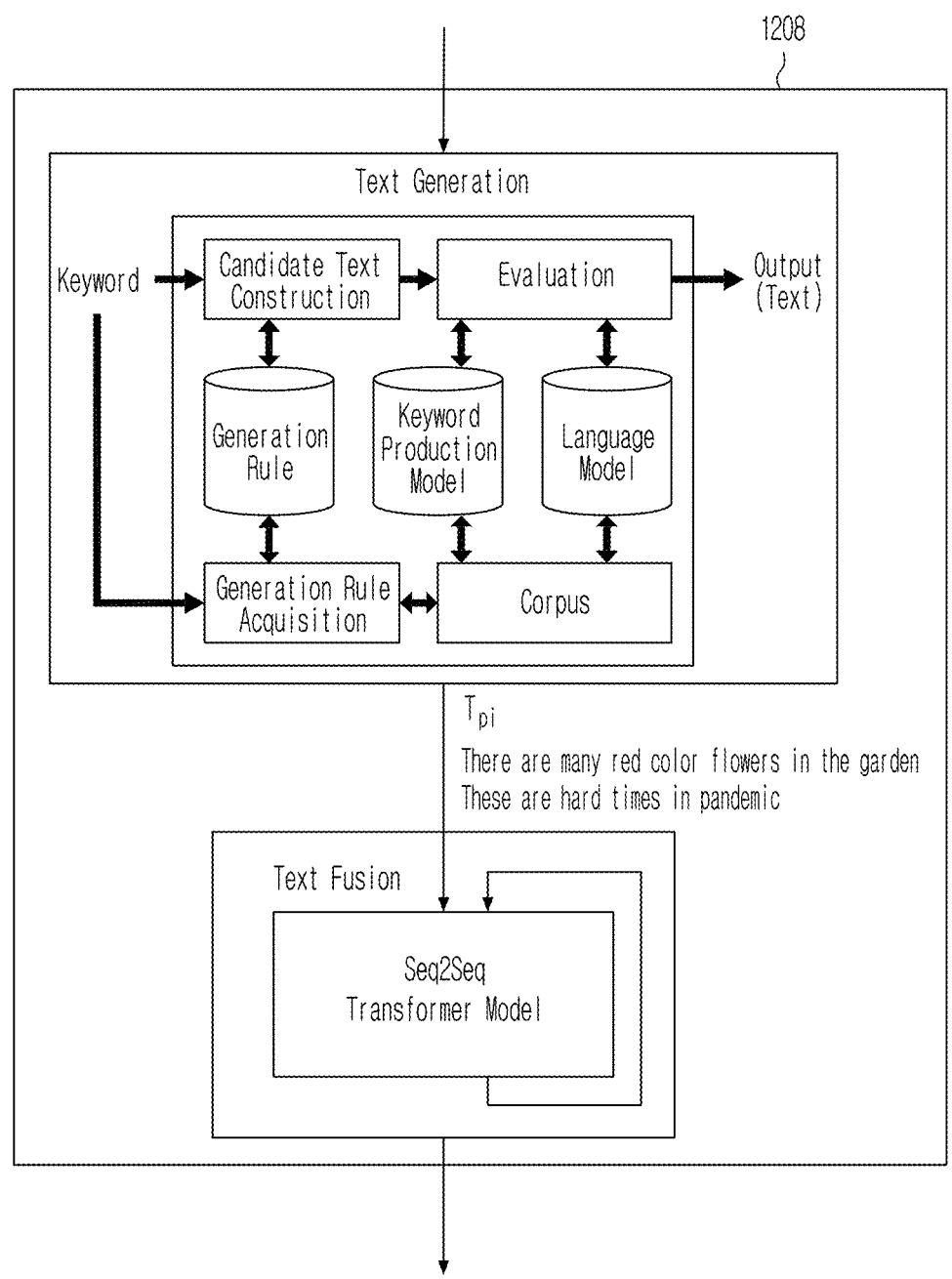
Figure 12D:
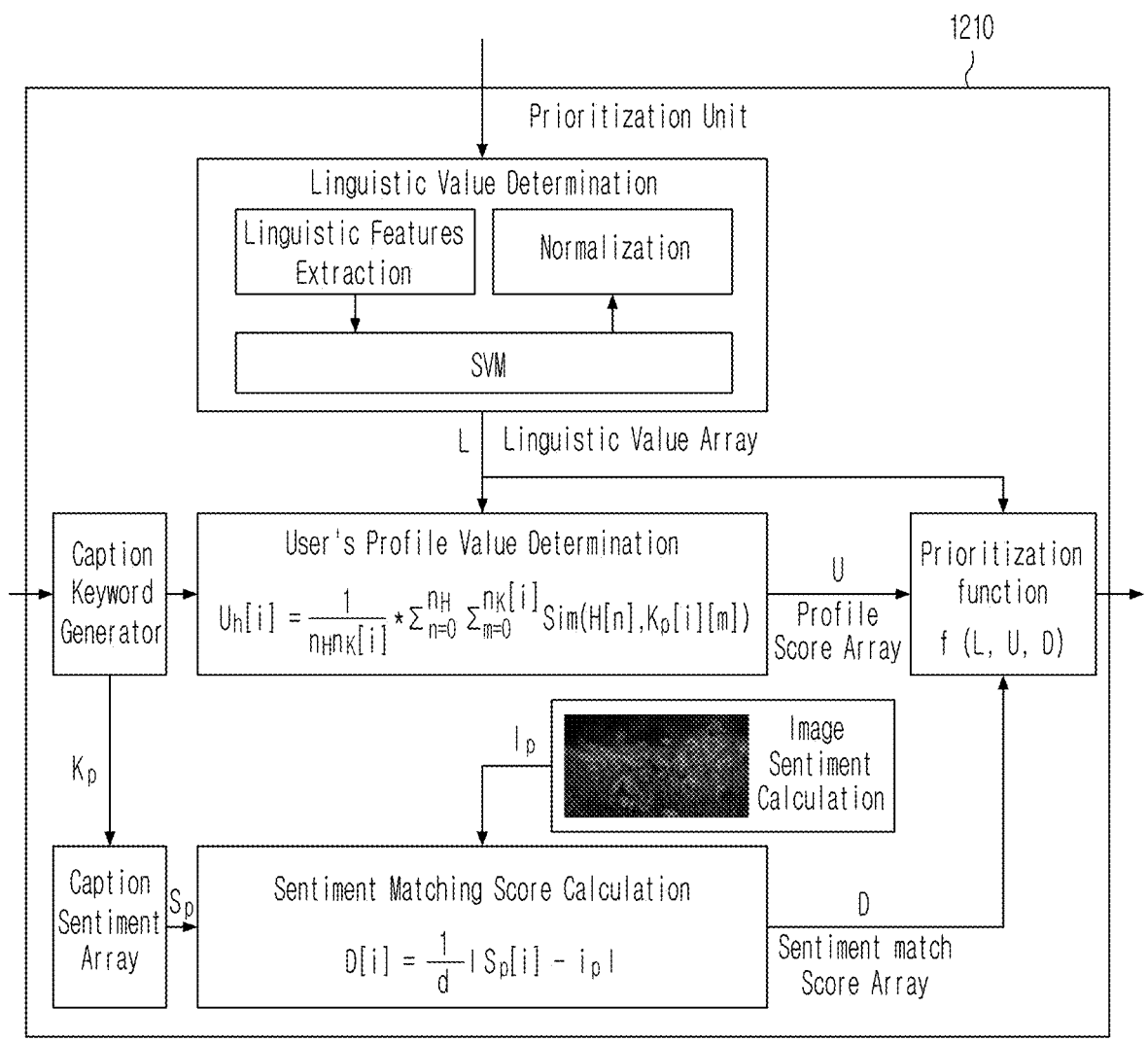

FIG. 11C illustrates yet another embodiment of the architectural diagram 400 depicting a method for suggesting at least one caption for an image, in accordance with an embodiment. The caption structure former 402 may include the impacting category determination engine 222, the impacting category-based grouping engine 224, and a variable impacting function re-ordering engine 1104. An impacting function employed by the variable impacting function re-ordering engine 1104 may be variable in nature and may not be a pre-defined in nature. A variable Impacting function that may be changed using user's sample of caption, or by manual input from the user, otherwise it can be a trained adaptive learning, Convolution Neural Network (CNN) model for varying the Impacting function based on the most trending captions.

FIGS. 12A-12D illustrate a use case diagram 1200 depicting a caption generation for an image, in accordance with an embodiment. The image may be received as in input.

At operation 1202, a context associated with the image is determined as described in the FIG. 5A.

At operation 1204, one or more contextual keywords associated with the image may be determined based on the context, as described in the FIG. 6B.

At operation 1206, a caption structure may be formed associated with the image. The caption structure may be based on grouping the one or more contextual keywords and re-ordering the one or more contextual keywords upon grouping, as described in FIG. 7A.

At operation 1208, a caption generation is performed for generating a number of captions based on a text generation and a text fusion.

At operation 1210, a prioritization of the number of captions is performed for identifying at least one caption from the number of captions with a highest priority value.

At operation 1212, a user selection is performed.

FIG. 13 illustrates a use case diagram 1300 depicting a caption suggestion for an image, in accordance with an embodiment.

At operation 1302, contextual keywords are determined related to the image

At operation 1304, the keywords are grouped and rearranged in a Caption structure. The arrangement is such that reader will have a positive impact first, then negative and finally an inspirational impact while reading the caption At operation 1306, Captions are generated keeping the impacting category order preserved.

At operation 1308, the caption having highest priority is suggested to the user.

Figure 14A:
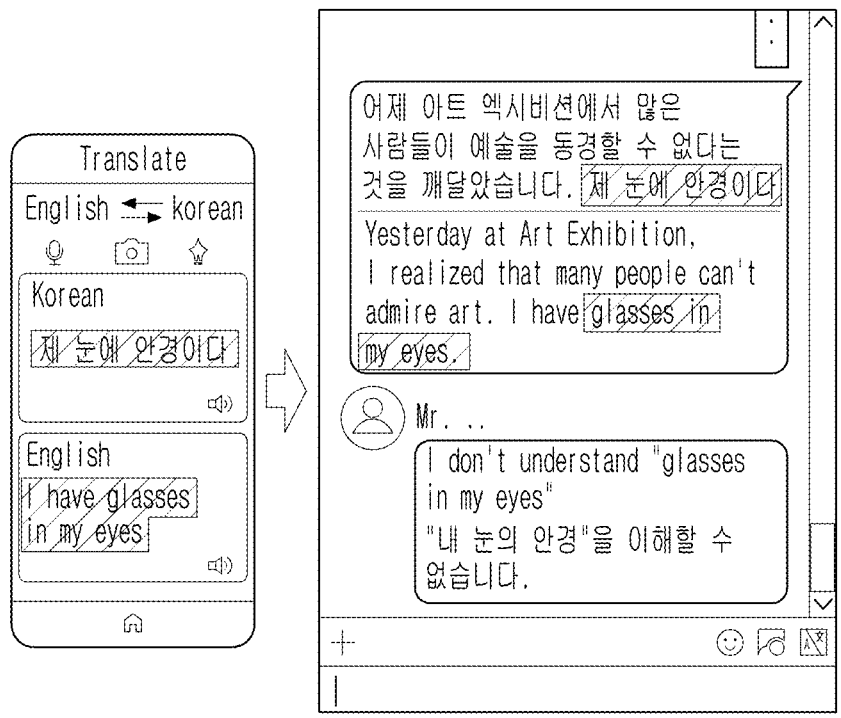
FIG. 14A illustrates a use case diagram depicting a language translation, in accordance with an existing prior art.

The caption structure of the suggested caption in the example shown is as follows:

A. Positive Text—Today's sunset was a beautiful scene with birds flying by.
B. Discourse connective 1—Although, =
C. Negative Text—these have been tough days for a lot of us
D. Discourse Connective 2—but
E. Inspirational text—sunset is a proof that everyday can end beautifully:

FIG. 14A illustrates a use case diagram 1400a depicting a language translation, in accordance with an existing prior art. An idiom—" 제 눈에 안경이다 " is wrongly translated without considering its impact.

Figure 14B:
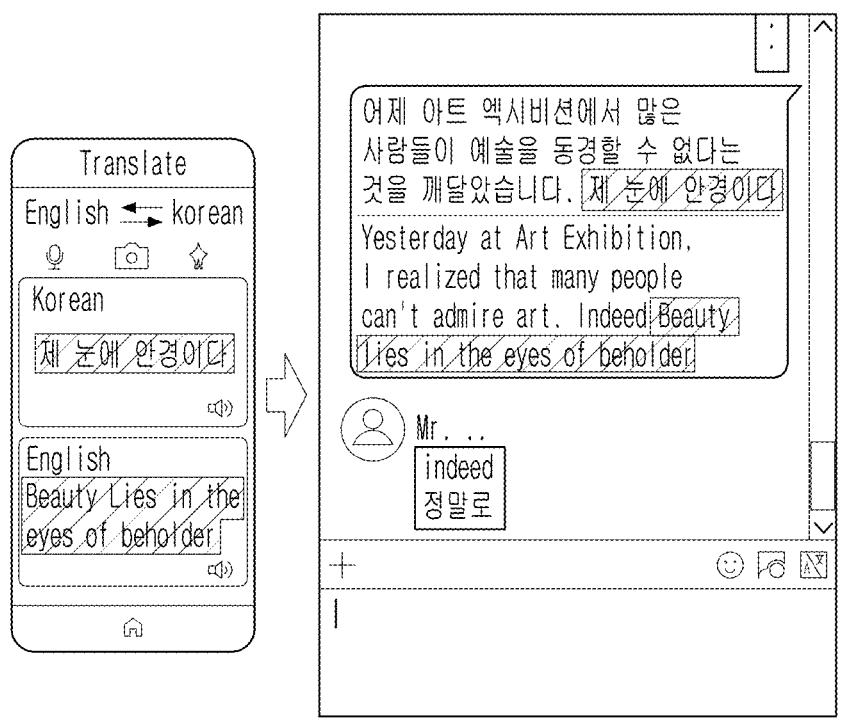
FIG. 14B illustrates a use case diagram depicting a language translation, in accordance with an embodiment.

FIG. 14B illustrates a use case diagram 1400b depicting a language translation, in accordance with an embodiment. The idiom—" 제 눈에 안경이다 " is correctly translated.

FIG. 15 illustrates a use case diagram 1500 depicting impacting conversations with virtual assistants, in accordance with an embodiment. Creating refined sentences for voice assistants or chatbots, making a more impactful conversion based on the impact that needs to be created for the user. Chat bots can generate text based on the response of user and can apply impact-based modification while text generation to create a human like response in conversation. Voice assistants can generate impact-based sentences and can convert that into speech retaining the impact to create a more human like response. In order to create a human robot or generate emotions in robot it is very important for it to be able to speak with impact and generate impacting responses in conversations. In games or any metaverse, the dialogues of NPCs are usually fixed and never changes. Their responses can be modified to change based on the speaker and be modified to generate sentences with impacts of choice. This may make NPCs and the whole metaverse more interactive and immersive.

In an embodiment, the present disclosure may further be utilized for a smart advertisement and a targeted product launch. Advertising right product to the right customer is one of the biggest areas for development and growth in recent times. Having data about impact of product on customer can be a huge step towards giving personalized product advertisements to the right users. Whenever user likes or share any post or comments about something, the data of impact in user's comment or the post can be recorded for the user about the context in the post. This data can be very useful to recognize the impact any particular context have created on the user. This data can be further used to analyze the products with positive or motivational impact on user and he can be advertised about similar products Furthermore, launching the product into the right market is as important as developing the product. Many startups fail because of poor product-market fit. Having a good idea of the impact your product will create in a specific market along with other necessary details can boost your launch heavily. Depending on the market being targeted by the company, the product can be designed to create a specific impact wherever possible as per the liking of target market. E.g.—Launching a keyboard with no keypad might not be a good idea in gaming market as gainers tend to be impacted in a negative way by that. While the same would be a good fit for coders.

The present disclosure may also be utilized for a customer feedback analysis. Customer's Feedback can be categorized based on the impact in their sentences and the simplified analysis can be used to create a better impact on users. Many a times surveys usually have a column that requires user to give contextual data about "Anything else", "Reasons Why?" etc. These contextual data are often time very hard to access and analyze as this people would have to manually read each one of them. The contextual data usually contains a lot of information and is important for good analysis of customer's feedback.

The contextual feedback can be used to categorize the surveys into various rated categories based on impact. This will help to identify surveys which are negatively impacted by product and so the required development can be done in product to improve. A proper analysis of these categories can be performed to find the percentage of positive, negative or any other impacts that are there in sentences and hence can be used to calculate an overall impact of the product on user. A further action can be taken on the feedbacks with negative impacts.

Other use cases may include an impact-based classification, a content analyzer, an impact-based filtering, a media categorization, a Text Recommendation, third party tie-ups.

All the social media contents, mails and any conversations can be classified into different categories based on impact, helping users to check for the ones they want depending on their mood. The classification can also be applied to users, to maintain a user's profile based on sentiments most displayed by the user in their contextual expressions.

A sentiment analyzer can be designed to give the percentage of each kind of sentiment generated in the content. This can be further extended to suggest textual recommendations to user based on the impact he desires to create. The analysis will also help users to improve their writings, and authors to create much more impacting books.

Many a times people have to face too much negativity on social media, while good and positive messages get lost among the flood of all other things.

A filtering of posts on social media will help users to filter out the posts which generate a non-desired sentiment for user. The method can also help to filter out emails, books and movies etc.

The classifications can be expanded to media as well. All the captured or received images can be sorted based on their impact. This will help user to easily search for the image as per his desire for the sentiment. The phone gallery can be categorized as per the sentiment associated. While autocorrect and text recommendations are used widely, it still lacks the ability to suggest content to user based on the sentiment in the sentence. The novel method will allow user to choose the sentiment that needs to be generated in the sentence and a word corresponding to that will be recommended to the user.

Tie-ups with 3rd party vendors will boost the usage and popularity of novel idea and will allow the feature to scale to various domains. Third party vendors can incorporate the feature of impact determination and suggestions based on impact. Grammarly already has a wide range of use case and a very stable text recommendation service. Providing the impact based suggestion to it will enhance the service to suggest sentences based on impact user wants to create. Tie-ups with third party OTT vendors to categorize the generated media according to the sentiment and impact associated with them. The impact-based suggestion will help users to search for media according to their desired impact, e.g.—people can search for motivational movies directly based on this feature.

Figure 16A:
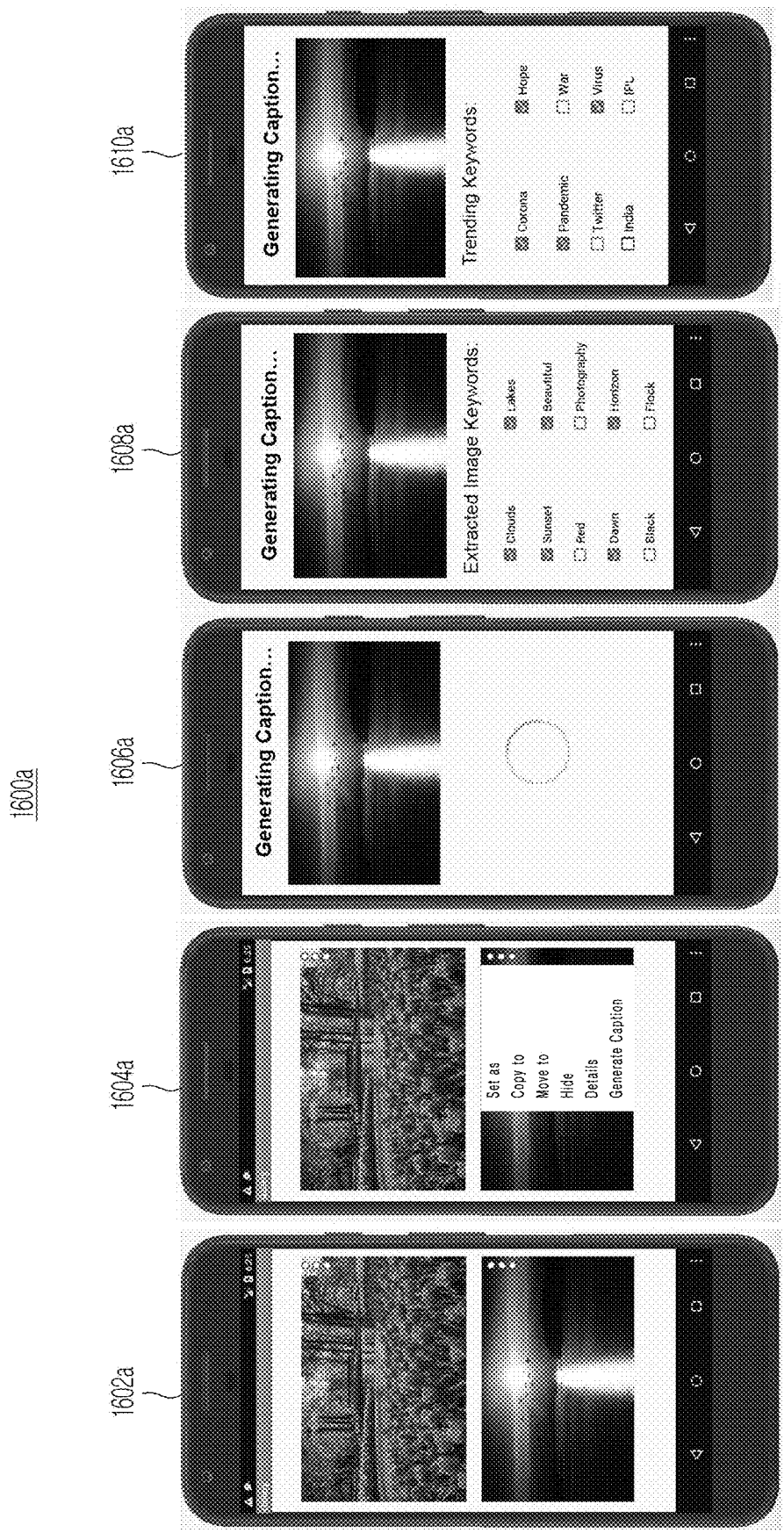
FIG. 16A illustrates a use case diagram depicting a scenario where a caption generation happens with in-line user inputs and feedback, in accordance with an embodiment.

FIG. 16A illustrates a use case diagram 1600a depicting a scenario where a caption generation happens with in-line user inputs and feedback, in accordance with an embodiment.

At operation 1602a, User selects an input image. An example shown here from Gallery. The method, corresponding to the use case of 1600a, may include receiving the user input for selecting an input image.

At operation 1604a, User clicks Generate Caption, For example, the user can request this from "More settings" of an image or any other method or app interface. The method, corresponding to the use case of 1600a, may include receiving the user input for selecting (or clicking) Generate Caption. The user input may include a control command for generating a caption, automatically.

At operation 1606a, caption generation begins. The on-device algorithm processes the image to generate list of image keywords.

At operation 1608a, image keywords are generated. For examples, user may be shown generated keywords related to the image. User can select or deselect a keyword or add a new keyword. The method, corresponding to the use case of 1600a, may include providing (or displaying) a screen including keywords related to the image. The method, corresponding to the use case of 1600a, may, include receiving a user input for selecting the keyword, deselecting the keyword or adding a new keyword, after providing the keywords related to the image.

At operation 1610a, trending keywords are generated. For example, user may be shown trending keywords related to ongoing trending topics. User can select or deselect a keyword or add a new keyword. The method, corresponding to the use case of 1600a, may include receiving a user input for providing (or displaying) a screen including trending keywords related to ongoing trending topics. The method, corresponding to the use case of 1600*a*, may include receiving a user input for selecting the keyword, deselecting the keyword or adding a new keyword, after providing the trending keywords related to ongoing trending topics.

Figure 16B:
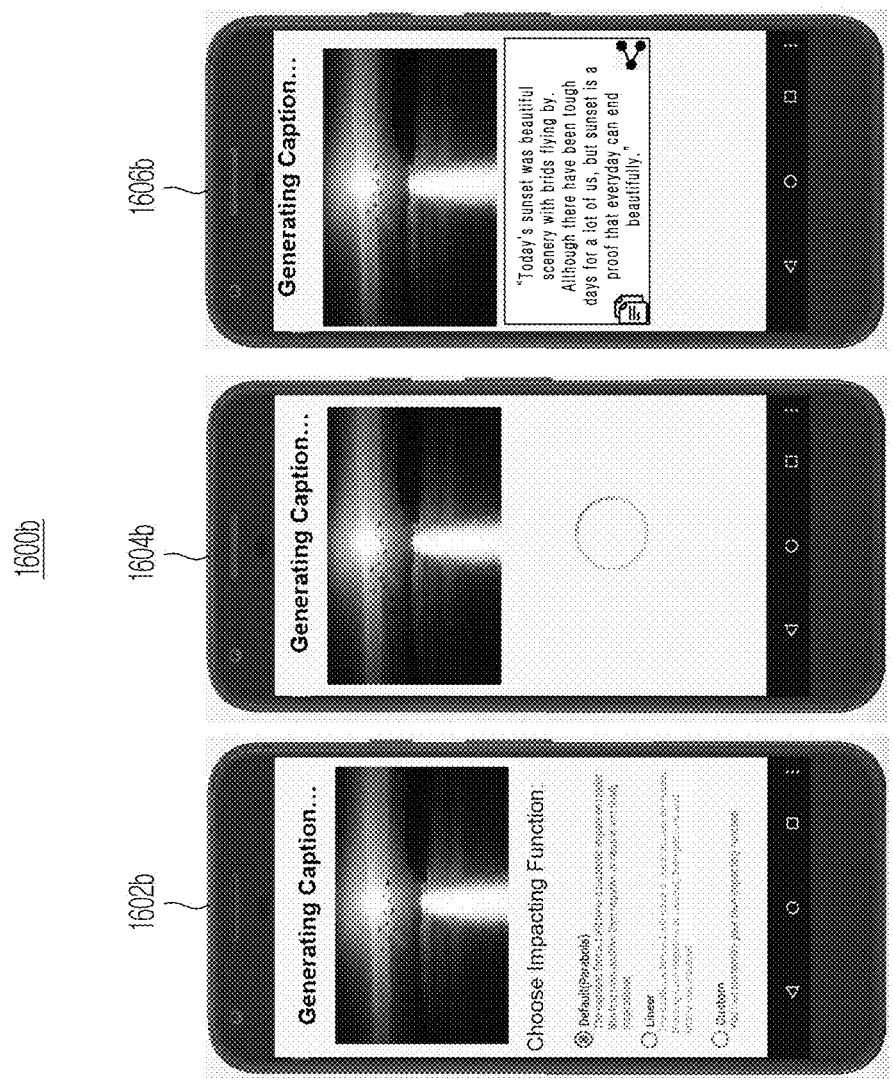
FIG. 16B illustrates a use case diagram depicting a scenario where user uses a default setting for impacting function, in accordance with an embodiment.

FIG. 16B illustrates a use case diagram 1600*b* depicting a scenario where user uses a default setting for impacting function, in accordance with an embodiment.

At operation 1602*b*, impacting function is performed. For example, user may be shown settings related to impacting function which is default set. User may select from a list of pre-defined functions or can define his own custom function. The method, corresponding to the use case of 1600*a*, may include receiving a user input for providing (or displaying) a screen including settings related to impacting function which is default set. The method, corresponding to the use case of 1600*a*, may include receiving a user input for selecting from a list of pre-defined functions. The method, corresponding to the use case of 1600*a*, may include receiving a user input for defining user own custom function.

At operation 1604*b*, sentence formation and prioritization is performed. For example, based on user's keywords selection and impacting function settings, caption generation begins.

At operation 1606*b*, a caption is generated. The generated caption includes the "Default (Parabola)" impacting function e.g., Default setting may correspond to: Positive→Negative→Inspirational Impact.

Figure 16C:
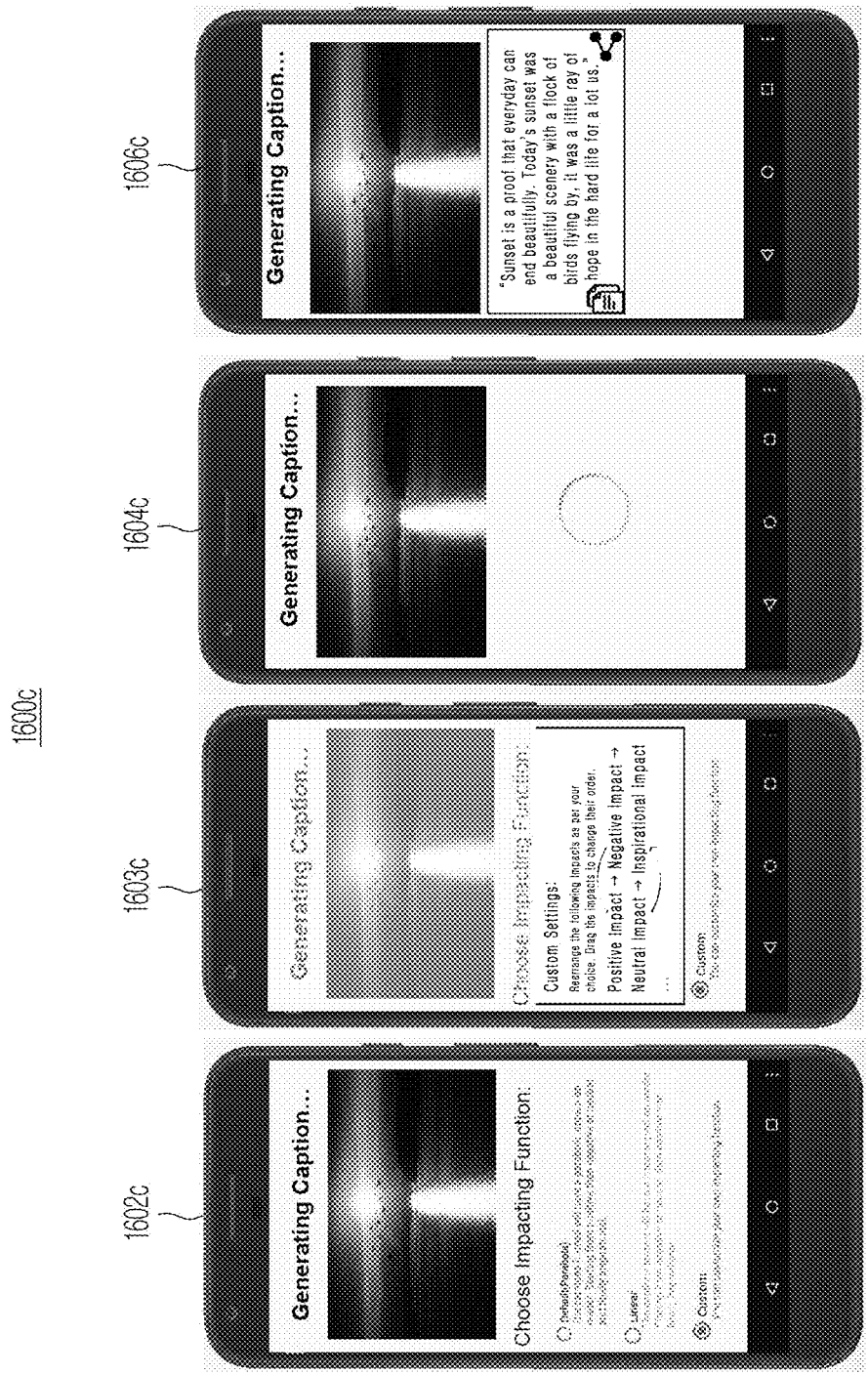
FIG. 16C illustrates a use case diagram depicting a scenario where user uses a custom setting for impacting function, in accordance with an embodiment.

FIG. 16C illustrates a use case diagram 1600*c* depicting a scenario where user uses a custom setting for impacting function, in accordance with an embodiment.

At operation 1602*c*, impacting function is performed, in an example, if user selects Custom Impacting Function (Based on receiving user selection of "Custom Impacting Function"), a Custom Settings guide may be shown to the user asking for re-arrangement of the Impacting categories. The new user defined impacting function may be used for further steps based on user input.

At operation 1603*c* and operation 104*c*, Sentence Formation and Prioritization is performed. E.g. Based on user's keywords selection and Impacting function settings, Caption generation begins. After user selecting "Custom Settings guide", Sentence Formation and Prioritization may perform based on the selectin result of the user.

Referring to the operation 1603*c*, a screen related with the operation (Sentence Formation and Prioritization) may be shown. The screen of the operation 1603*c* may include information, corresponding to the selection (Custom Settings guide) of the user. The information corresponding to the selection may include guide information and/or item information.

The guide information may include text indicating user may rearrange order of impacts for generating the caption. For example, the guide information may include text including "rearrange the following impacts as per your choice" or/and "drag the impacts to change their order".

The item information may include each item corresponding to each impact from the impacts. Based on the user input for changing the order of the impact(s), the order of the impact(s) may be rearranged (changed). The operation of the Sentence Formation and Prioritization may process based on the rearranged order of the impacts.

A first background color of a first screen corresponding to the operation 1602*c* may be different from a second background color of a second screen corresponding to the operation 1603*c*.

According to various embodiments, the (first) screen of the Sentence Formation and Prioritization may be omitted, and at operation 1604*c* the Sentence Formation and Prioritization may be performed based on default settings.

At operation 1606*c*, caption is generated. The generated caption has the "Custom" Impacting function. For example, custom may correspond to Inspirational→Positive→Negative Impact.

Figure 16D:
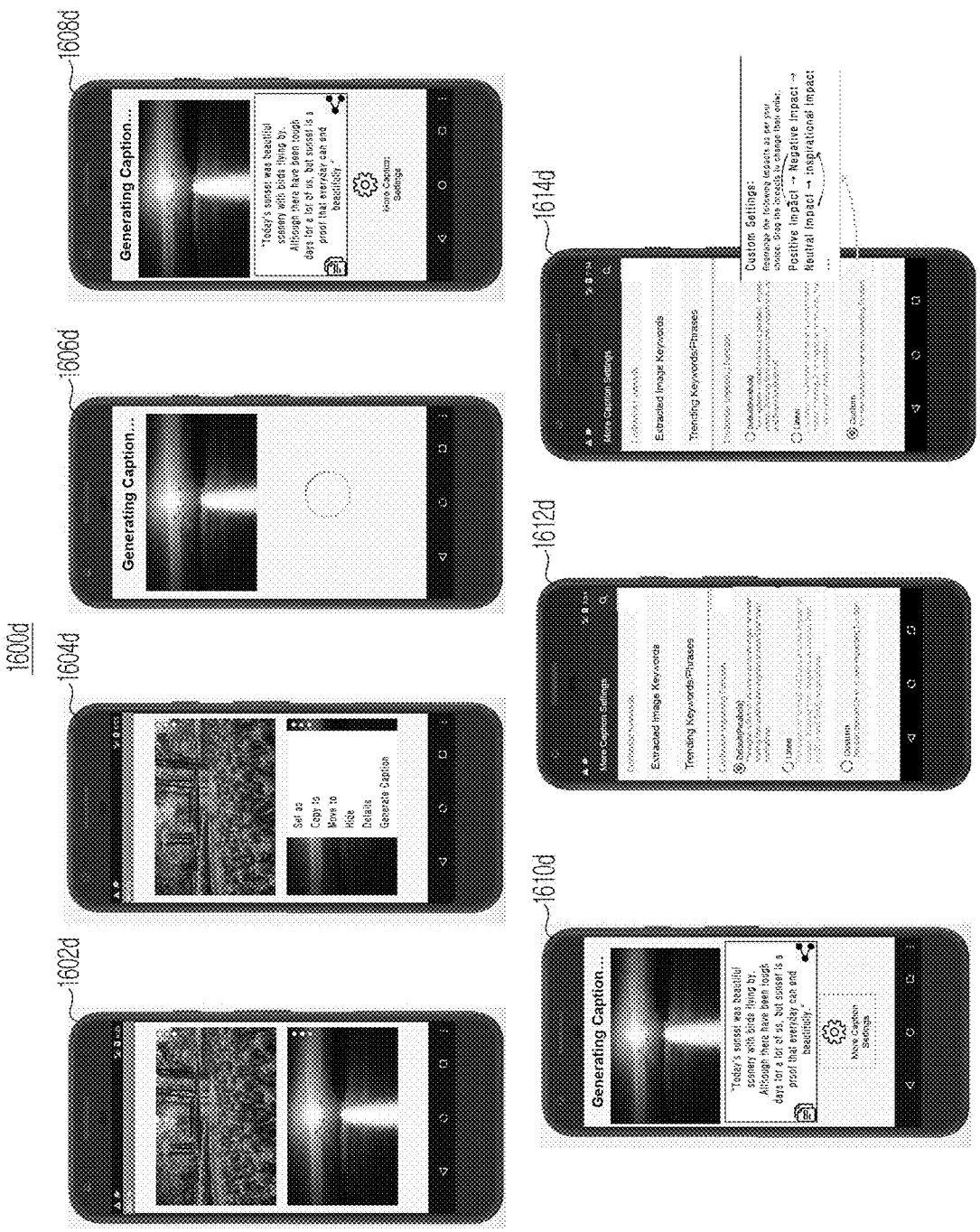
FIG. 16D illustrates a use case diagram depicting a scenario where an automatic caption generation may take place, in accordance with an embodiment.

FIG. 16D illustrates a use case diagram 1600*d* depicting a scenario where an automatic caption generation may take place, in accordance with an embodiment. User feedback may be taken at end. In an embodiment, a user may configure one or more settings after the automatic caption generation.

At operation 1602*d*, user selects an input image. For example, shown here from gallery. The method, corresponding to the use case of 1600*a*, may include receiving a user input for selecting the input image.

At operation 1604*d*, user clicks generate caption. e.g., the user can request this from "More settings" of an image or any other method or app interface. The method, corresponding to the use case of 1600*a*, may include receiving the user input for selecting (or clicking) Generate Caption.

At operation 1606*d*, caption generation begins. The on-device algorithm processes the image to generate caption with default settings.

At operation 1608*d*, caption is generated. The generated caption has the "Default (Parabola)" Impacting function. e.g., Default setting may correspond to: Positive→Negative→Inspirational Impact.

At operation 1610*d*, User clicks on more caption settings. If user clicks on more caption settings, user may be shown a number of caption related settings which may be customized. The method, corresponding to the use case of 1600*a*, may include receiving a user input for selecting (or clicking) on more caption settings. Based on receiving the user input for selecting (or clicking) on more caption settings, The method, corresponding to the use case of 1600*a*, may include providing (or displaying) a screen including a number of caption related settings which may be customized.

At operation 1612*d*, more caption settings may be shown. For example, current caption settings may be shown to the user.

At operation 1614*d*, user changes caption settings. For example, If user sets some custom settings for Impacting Function, the output may be changed. Otherwise, the settings set by user will be used for further captions.

While specific language has been used to describe the disclosure, any limitations arising on account of the same are not intended. As would be apparent to a person in the art, various working modifications may be made to the method in order to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims and their equivalents.

What is claimed is:

1. A method for suggesting a caption for an image, comprising:
   receiving, by a receiving engine, the image as an input;
   determining, by an impacting category determination engine, a plurality of impacting categories associated with a plurality of contextual keywords for the image, wherein each of the plurality of impacting categories represent a sentiment associated with the plurality of contextual keywords;
   grouping, by an impacting category-based grouping engine, the plurality of contextual keywords into a plurality of groups based on the plurality of impacting categories;
   determining, by a re-ordering engine, an order associated with the plurality of contextual keywords, grouped in the plurality of groups, based on a pre-determined impacting function;
   generating, by a caption generation engine, at least one caption by processing each contextual keyword, grouped in the plurality of groups, based on the order associated with the plurality of contextual keywords grouped in the plurality of groups;
   determining, by a prioritization engine, a priority value associated with each of the at least one caption based on information associated with the corresponding caption, a user profile, and the image; and
   suggesting, by the prioritization engine, the caption from the at least one caption based on the priority value associated with each of the at least one caption.

2. The method of claim 1, further comprising:
   determining, by a context determination engine, a plurality of fields associated with the image, wherein the plurality of fields comprises at least one of an object, a person, a filter, a camera setting, a sentiment, a time, and a place associated with the image;
   determining, by the context determination engine, a plurality of context words associated with the image based on the plurality of fields by classifying the plurality of fields; and
   determining, by a contextual keywords determination engine, the plurality of contextual keywords associated with the image based on the plurality of context words.

3. The method of claim 1, further comprising:
   mapping a plurality of context words associated with the image with a plurality of words stored in a lexical database; and
   determining the plurality of contextual keywords based on the mapping of the plurality of context words with the plurality of words in the lexical database, at least one synonym, at least one adverb, at least one adjective, at least one proverb, at least one quote, and at least one trending keyword related to the plurality of context words.

4. The method of claim 1, wherein the determining the plurality of impacting categories associated with the plurality of contextual keywords comprises:
   classifying at least one contextual keyword from the plurality of contextual keywords, as one of an adjective, a noun, a pronoun, an adverb, or a phrase, based on pre-stored information associated with the plurality of contextual keywords; and
   mapping the at least one contextual keyword with a plurality of words stored in a database to determine an impact score associated with the at least one contextual keyword, wherein each of the plurality of words corresponds to an impact score in the database; and
   determining the plurality of impact categories associated with the plurality of contextual words based on the impact score associated with the at least one contextual keyword.

5. The method of claim 1, wherein the order associated with the plurality of contextual keywords is an order of an impact intended to be created on a user with respect to the image.

6. The method of claim 1, wherein the plurality of impacting categories comprise a positive impact category, a negative category, an inspirational impact category, a motivational impact category, a de-motivational impact category, and a neutral impact category.

7. The method of claim 1, further comprising:
   forming, by the re-ordering engine, a caption structure associated with the image, based on the plurality of groups wherein, the order associated with the plurality of contextual keywords, grouped in the plurality of groups, is determined based on the caption structure.

8. The method of claim 1, wherein the generating the at least one caption comprises:
   generating a plurality of texts for the plurality of groups that are ordered in a caption structure, wherein each text from the plurality of texts is generated for each contextual keyword grouped in the plurality of groups; and
   fusing the plurality of texts together based on a connector associated with the plurality of texts to generate the at least one caption.

9. The method of claim 1, wherein the information associated with the corresponding caption, the user profile, and the image comprises a linguistic value, a user profile value, and a sentiment difference value associated with the at least one caption.

10. The method of claim 1, wherein the determining, by the prioritization engine, the priority value associated with each of the at least one caption comprises:
    determining, by the prioritization engine, a linguistic value, a user profile value, and a sentiment difference value associated with the at least one caption.

11. The method of claim 10, wherein the determining, by the prioritization engine, the linguistic value associated with the at least one caption comprises:
    determining a complexity associated with each of the at least one caption using a Natural Language Processing (NLP) tool to extract at least one linguistic feature from each caption; and
    generating the linguistic value associated with each caption by assigning a score to each caption based on the complexity of each keyword associated with each caption.

12. The method of claim 11, wherein the determining the complexity associated with each of the at least one caption comprises:

performing a categorization of the at least one caption based on at least one lexical feature, at least one morphological feature, at least one raw text feature, at least one morpho-syntactic feature, at least one syntactic feature, and at least one discursive feature associated with the at least one caption.

13. The method of claim 1, wherein the determining, by the prioritization engine, the user profile value associated with each of the at least one caption comprises:
determining an age-based scoring associated with the at least one caption for a user based on the at least one linguistic value; and
determining a hobby-based scoring associated with the at least one caption for the user based on at least one keyword in the at least one caption, wherein each keyword is scored against at least one hobby of the user using a similarity score.

14. The method of claim 1, wherein the determining, by the prioritization engine, the sentiment difference value associated with each of the at least one caption comprises:
generating a caption sentiment associated with the at least one caption by performing a weighted summation of a sentiment score associated with at least one keyword in the at least one caption;
calculating an image sentiment associated with the at least one caption by performing a weighted summation of the sentiment associated with each of the plurality of contextual keywords associated with the image; and
determining the at least one sentiment difference value associated with the at least one caption based on the caption sentiment and the image sentiment.

15. The method of claim 14, wherein the sentiment score associated with the at least one keyword is calculated based on mapping the at least one keyword with a plurality of words stored in a database, in which each of the plurality of words corresponds to a sentiment score in the database.

16. The method of claim 1, wherein the determining, by the prioritization engine, the priority value associated with each of the at least one caption comprises:
assigning a weight to each of the linguistic value, the user profile value, and the sentiment difference value associated with the at least one caption for a user, wherein each weight is determined based on a gradient descent model;
performing a weighted summation of the linguistic value, the user profile value, and the sentiment difference value associated with the at least one caption based on the weight to generate the priority value.

17. The method of claim 16, further comprising:
tuning, by the prioritization engine, the priority value based on user feedback associated with at least one previously generated caption for the user.

18. The method of claim 1, further comprising:
modifying, by a modification engine, the at least one caption based on a user input with respect to the at least one caption.

19. The method of claim 18, wherein the user input is a selection of at least one customized setting associated with the at least one caption for generating at least one new caption, wherein the at least one customized setting is presented to the user on a User Interface (UI).

20. A system for suggesting a caption for an image, the system comprising:
a receiving engine configured to receive the image as an input;
an impacting category determination engine configured to determine a plurality of impacting categories associated with a plurality of contextual keywords for the image, wherein each of the plurality of impacting categories represent a sentiment associated with the plurality of contextual keywords;
an impacting category-based grouping engine configured to group the plurality of contextual keywords into a plurality of groups based on the plurality of impacting categories;
a re-ordering engine configured to determine an order associated with the plurality of contextual keywords, grouped in the plurality of groups, based on a pre-determined impacting function;
a caption generation engine configured to generate at least one caption from the plurality of groups by processing each contextual keyword, grouped in the plurality of groups, based on the order associated with the plurality of contextual keywords grouped in the plurality of groups; and
a prioritization engine configured to determine a priority value associated with each of the at least one caption based on information associated with the corresponding caption, a user profile, and the image,
wherein the prioritization engine is further configured to suggest the caption from the at least one caption based on the priority value associated with each of the at least one caption.

* * * * *